United States Patent
Rabinovich et al.

(10) Patent No.: US 11,948,256 B2
(45) Date of Patent: *Apr. 2, 2024

(54) SYSTEMS AND METHODS FOR ARTIFICIAL INTELLIGENCE-BASED VIRTUAL AND AUGMENTED REALITY

(71) Applicant: Magic Leap, Inc., Plantation, FL (US)

(72) Inventors: Andrew Rabinovich, San Francisco, CA (US); John Monos, Venice, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/704,998

(22) Filed: Mar. 25, 2022

(65) Prior Publication Data

US 2022/0215640 A1    Jul. 7, 2022

Related U.S. Application Data

(63) Continuation of application No. 16/596,610, filed on Oct. 8, 2019, now Pat. No. 11,315,325.
(Continued)

(51) Int. Cl.
*G06T 19/00* (2011.01)
*G02B 27/01* (2006.01)
(Continued)

(52) U.S. Cl.
CPC ............ *G06T 19/006* (2013.01); *G02B 27/01* (2013.01); *G06F 1/163* (2013.01); *G06F 3/011* (2013.01); *G06F 21/53* (2013.01); *G06T 15/005* (2013.01)

(58) Field of Classification Search
None
See application file for complete search history.

(56) References Cited

U.S. PATENT DOCUMENTS

| 4,852,988 A | 8/1989 | Velez |
| 6,433,760 B1 | 8/2002 | Vaissie |

(Continued)

FOREIGN PATENT DOCUMENTS

| CA | 2316473 A1 | 1/2001 |
| CA | 2362895 A1 | 12/2002 |

(Continued)

OTHER PUBLICATIONS

Azuma, Ronald T. (Aug. 1997). "A Survey of Augmented Reality," In Presence: Teleoperators and Virtual Environments 6, 4, Hughes Research Laboratories, Malibu, CA, located at: https://web.archive.org/web/20010604100006/http://www.cs.unc.edu/~azuma/ARpresence.pdf, retrieved on Oct. 26, 2020.

(Continued)

*Primary Examiner* — Jason A Pringle-Parker
(74) *Attorney, Agent, or Firm* — MORRISON & FOERSTER LLP

(57) ABSTRACT

Examples of the disclosure describe systems and methods for generating and displaying a virtual companion. In an example method, a first input from an environment of a user is received at a first time via a first sensor on a head-wearable device. An occurrence of an event in the environment is determined based on the first input. A second input from the user is received via a second sensor on the head-wearable device, and an emotional reaction of the user is identified based on the second input. An association is determined between the emotional reaction and the event. A view of the environment is presented at a second time later than the first time via a see-through display of the head-wearable device. A stimulus is presented at the second time via a virtual companion displayed via the see-through display, wherein the stimulus is determined based on the determined association between the emotional reaction and the event.

20 Claims, 18 Drawing Sheets

Related U.S. Application Data

(60) Provisional application No. 62/743,492, filed on Oct. 9, 2018.

(51) Int. Cl.
  *G06F 1/16*      (2006.01)
  *G06F 3/01*      (2006.01)
  *G06F 21/53*     (2013.01)
  *G06T 15/00*     (2011.01)

(56) References Cited

U.S. PATENT DOCUMENTS

| | | |
|---|---|---|
| 6,491,391 B1 | 12/2002 | Blum et al. |
| 6,847,336 B1 | 1/2005 | Lemelson |
| 6,943,754 B2 | 9/2005 | Aughey |
| 6,977,776 B2 | 12/2005 | Volkenandt et al. |
| 7,347,551 B2 | 3/2008 | Fergason et al. |
| 7,461,001 B2 | 12/2008 | Liqin et al. |
| 7,488,294 B2 | 2/2009 | Torch |
| 8,235,529 B1 | 8/2012 | Raffle |
| 8,611,015 B2 | 12/2013 | Wheeler |
| 8,638,498 B2 | 1/2014 | Bohn et al. |
| 8,696,113 B2 | 4/2014 | Lewis |
| 8,929,589 B2 | 1/2015 | Publicover et al. |
| 9,010,929 B2 | 4/2015 | Lewis |
| 9,274,338 B2 | 3/2016 | Robbins et al. |
| 9,292,973 B2 | 3/2016 | Bar-zeev et al. |
| 9,720,505 B2 | 8/2017 | Gribetz et al. |
| 10,013,053 B2 | 7/2018 | Cederlund et al. |
| 10,025,379 B2 | 7/2018 | Drake et al. |
| 11,315,325 B2 | 4/2022 | Rabinovich et al. |
| 2003/0011639 A1 | 1/2003 | Webb |
| 2003/0030597 A1 | 2/2003 | Geist |
| 2006/0023158 A1 | 2/2006 | Howell et al. |
| 2006/0066567 A1 | 3/2006 | Scharenbroch et al. |
| 2009/0055019 A1 | 2/2009 | Stiehl et al. |
| 2009/0158203 A1 | 6/2009 | Kerr et al. |
| 2011/0211056 A1 | 9/2011 | Publicover et al. |
| 2011/0213664 A1 | 9/2011 | Osterhout |
| 2012/0021806 A1 | 1/2012 | Maltz |
| 2012/0075463 A1 | 3/2012 | Chen et al. |
| 2013/0009993 A1 | 1/2013 | Horseman |
| 2013/0063550 A1 | 3/2013 | Ritchey et al. |
| 2013/0083062 A1 | 4/2013 | Geisner et al. |
| 2013/0103624 A1 | 4/2013 | Thieberger |
| 2013/0226926 A1 | 8/2013 | Beaurepaire |
| 2014/0098125 A1 | 4/2014 | Fein et al. |
| 2014/0098133 A1 | 4/2014 | Fein et al. |
| 2014/0098134 A1* | 4/2014 | Fein .................. G06T 19/006 345/633 |
| 2014/0125678 A1* | 5/2014 | Wang .................. A63F 13/80 345/473 |
| 2014/0195918 A1 | 7/2014 | Friedlander |
| 2014/0223462 A1* | 8/2014 | Aimone .................. G16H 40/67 725/10 |
| 2014/0277735 A1 | 9/2014 | Breazeal |
| 2015/0168731 A1 | 6/2015 | Robbins |
| 2015/0302652 A1 | 10/2015 | Miller |
| 2016/0055236 A1 | 2/2016 | Frank et al. |
| 2016/0171063 A1 | 6/2016 | Kiciman et al. |
| 2016/0225187 A1 | 8/2016 | Knipp et al. |
| 2017/0178407 A1 | 6/2017 | Gaidar et al. |
| 2018/0012417 A1* | 1/2018 | Haseltine .................. G06T 19/20 |
| 2018/0184959 A1* | 7/2018 | Takahashi .................. A61B 5/1118 |
| 2018/0338109 A1 | 11/2018 | Badr et al. |
| 2019/0008466 A1* | 1/2019 | Shimota .................. G06V 40/20 |
| 2020/0057486 A1 | 2/2020 | Sugihara et al. |
| 2020/0111262 A1 | 4/2020 | Rabinovich et al. |
| 2021/0145340 A1 | 5/2021 | Asukai |

FOREIGN PATENT DOCUMENTS

| | | |
|---|---|---|
| CA | 2388766 A1 | 12/2003 |
| EP | 1406135 B1 | 8/2012 |
| JP | 2018124981 A | 8/2018 |
| JP | 2019003924 A | 1/2019 |
| WO | 2018154933 A1 | 8/2018 |
| WO | 2019207896 A1 | 10/2019 |

OTHER PUBLICATIONS

Bimber, Oliver et al. (2005). "Spatial Augmented Reality: Merging Real and Virtual Worlds," A. K. Peters, Ltd., Wellesley, MA.
European Search Report dated Nov. 23, 2021, for EP Application No. 19871243.2, ten pages.
Final Office Action dated Feb. 8, 2021, for U.S. Appl. No. 16/596,610, filed Oct. 8, 2019, 17 pages.
Final Office Action dated Nov. 8, 2021, for U.S. Appl. No. 16/596,610, filed Oct. 8, 2019, 17 pages.
International Preliminary Report on Patentability dated Apr. 22, 2021, for PCT Application No. PCT/US2019/55257, filed Oct. 8, 2019, 9 pages.
International Search Report and Written Opinion, dated Jan. 9, 2020, for PCT Application No. PCT/US2019/55257, filed Oct. 8, 2019, fifteen pages.
Non-Final Office Action dated May 28, 2021, for U.S. Appl. No. 16/596,610, filed Oct. 8, 2019, 17 pages.
Non-Final Office Action dated Sep. 25, 2020, for U.S. Appl. No. 16/596,610, filed Oct. 8, 2019, 14 pages.
Notice of Allowance dated Feb. 25, 2022, for U.S. Appl. No. 16/596,610, filed Oct. 8, 2019, 7 pages.
Notice of Allowance dated Mar. 25, 2022, for U.S. Appl. No. 16/596,610, filed Oct. 8, 2019, 4 pages.
Jacob, R. "Eye Tracking in Advanced Interface Design", Virtual Environments and Advanced Interface Design, Oxford University Press, Inc. (Jun. 1995).
Rolland, J. et al., "High-resolution inset head-mounted display", Optical Society of America, vol. 37, No. 19, Applied Optics, (Jul. 1, 1998).
Tanriverdi, V. et al. (Apr. 2000). "Interacting With Eye Movements in Virtual Environments," Department of Electrical Engineering and Computer Science, Tufts University, Medford, MA 02155, USA, Proceedings of the SIGCHI conference on Human Factors in Computing Systems, eight pages.
Yoshida, A. et al., "Design and Applications of a High Resolution Insert Head Mounted Display", (Jun. 1994).
Japanese Office Action dated Oct. 23, 2023, for JP Application No. 2021-519567, with English translation, 29 pages.

* cited by examiner

SYSTEMS AND METHODS FOR ARTIFICIAL INTELLIGENCE-BASED VIRTUAL AND AUGMENTED REALITY

CROSS-REFERENCE TO RELATED APPLICATIONS

This application is a Continuation of U.S. Non-Provisional application Ser. No. 16/596,610, filed Oct. 8, 2019, which claims priority to U.S. Provisional Application No. 62/743,492, filed on Oct. 9, 2018, the contents of which are incorporated by reference herein in their entirety.

FIELD

This invention is related to mobile computing systems, methods, and configurations, and more specifically to mobile computing systems, methods, and configurations featuring at least one wearable component which may be utilized for virtual and/or augmented reality operation.

BACKGROUND

One goal of artificial intelligence, or "AI," is to perform a task defined by a human, but in a way that meets or exceeds a human's ability to perform it. Self-driving cars, music recommendation systems, and other sophisticated computing systems can be examples of where AI contributes greatly to the successes that many humans love and enjoy. Such artificial intelligence systems may be configured to emulate the function of the human brain, and often surpass its performance on certain tasks, such as certain aspects of face recognition or information retrieval, to name a few. Artificial intelligence can be a computation model that aims to achieve results that humans can define as rewarding (other examples include winning at the Jeopardy game, or the Alpha Go game). Such systems may not be "conscious" or "aware"; they can be described as pattern matching machines.

A human centered artificial intelligence system or configuration can comprise both a brain and a mind and can comprise a computational model that captures both. A mind may be the dual of the brain and responsible self-awareness. The mind may be synonymous with a human's thoughts, feelings, memories, and/or experiences, and as the source of human behaviors. By capturing this duality, embodiments described herein may humanize AI with the subject systems and configurations thereof. To paraphrase famous chef Anthony Bourdain, the perfect meal occurs in context and leaves a memory; it often has very little to do with the food itself. The brain processes the food, the mind is responsible for the rest. Mindful experiences can be more desirable and memorable to users.

BRIEF SUMMARY

Examples of the disclosure describe systems and methods for generating and displaying a virtual companion. In an example method, a first input from an environment of a user is received at a first time via a first sensor on a head-wearable device. An occurrence of an event in the environment is determined based on the first input. A second input from the user is received via a second sensor on the head-wearable device, and an emotional reaction of the user is identified based on the second input. An association is determined between the emotional reaction and the event. A view of the environment is presented at a second time later than the first time via a see-through display of the head-wearable device. A stimulus is presented at the second time via a virtual companion displayed via the see-through display, wherein the stimulus is determined based on the determined association between the emotional reaction and the event.

DETAILED DESCRIPTION

Figure 1:
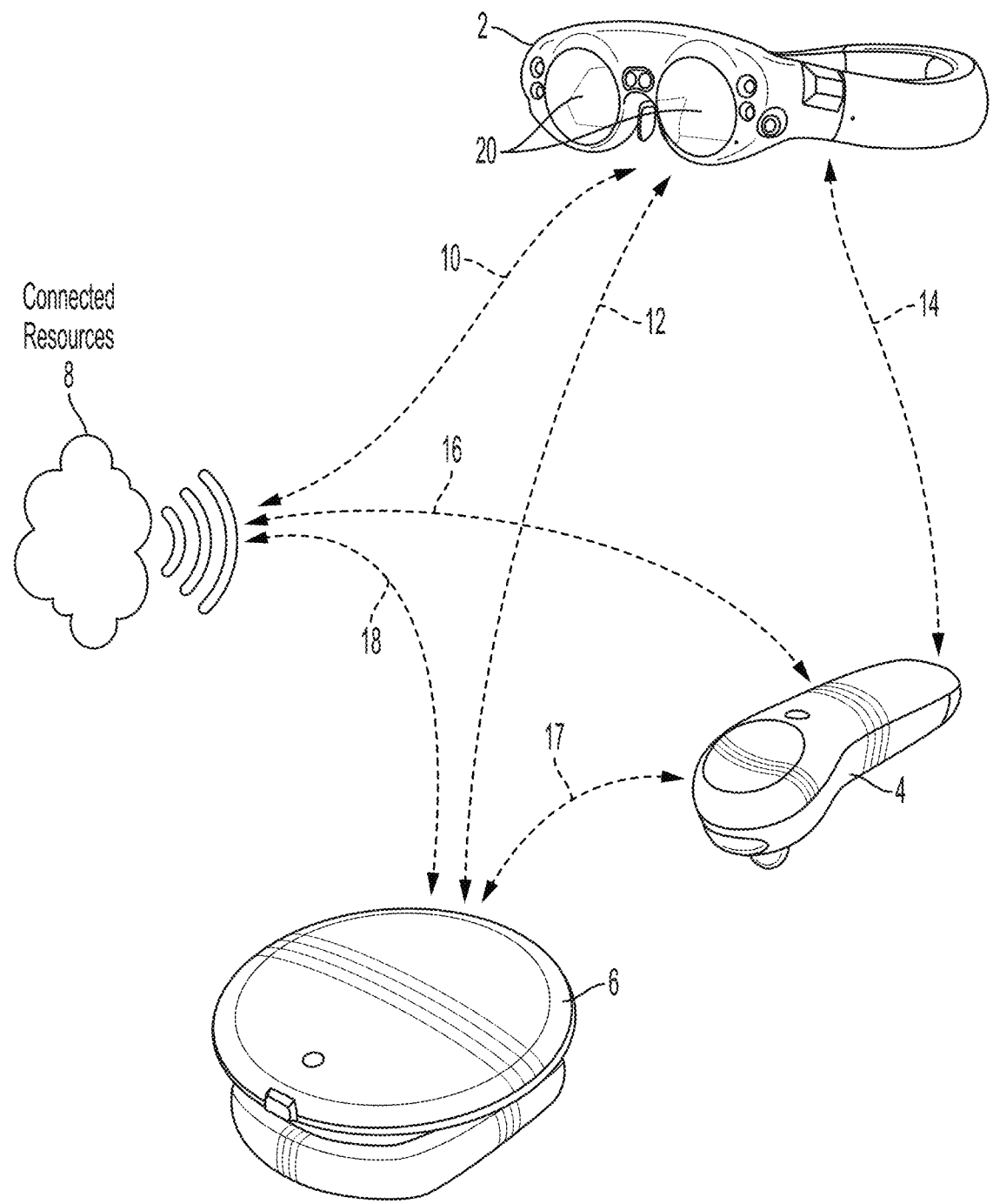
FIG. 1 illustrates an example computing platform, according to one or more embodiments of the disclosure.

In addressing this human centered AI challenge, there can be many issues and variations to address. For example, what are the best experiences for the particular human or group thereof? There are some ready answers to this based upon typically available systems (such as those described in the aforementioned incorporated applications, or other available computing systems configured for human interaction) and human uses of such systems: uses that relate to screens, such as television watching or conventional computing on a two-dimensional monitor, game participation, web browsing, etc. These experiences are expected on any modern computing platform, including systems such as those illustrated in FIG. 1. With a system such as that illustrated in FIG. 1, one has a system that gathers a lot of information regarding the world around it—but also, and possibly more importantly, such a system may be configured to gather a lot of information regarding the user. The user can be at the center of many mixed reality experiences, and the world can become the canvas for these experiences. Some of the most attractive mixed reality experiences may be ones wherein the content displayed for a user is "intelligent" and based upon context. In other words, with such configurations, there may be a cause and effect wherein the user does something and the experience responds to that input. The "intelligence" in the experience doesn't just come from the experience itself, but can also come from the platform. For example, having some information/knowledge at the system level regarding where in an environment the person is, what or who are they are surrounded by, can be very useful. The system also may be configured to infer or recall information regarding a user's emotions and relevant associations. The system may be configured to gather information pertaining to who is speaking and what is being said. These can be foundational issues of the human centered AI challenge. One important question to answer when developing an experience can be "what is the need that we're trying to fulfill?" Various answers can include entertainment, communication, understanding of information or knowledge. Each of these needs may be driven by perception, feelings, and thought. There are plenty of examples of AI acting very "machine-like". Many are able to take large amounts of data and create resultant models based on that data. Often humans do not adequately understand how this works. Conversely, computers generally don't "understand" how humans work. Generally, AI systems may be configured to efficiently arrive at an accurate answer based on the data that trained them. One challenge can be to take machine learning, coupled with the rich outputs of computing systems, and use them to fulfill human needs in mixed reality experiences. It can be desirable to do so in a way that the AI disappears, or becomes integrated into the computing engagement. Thus it is an objective to design systems that can be easily understood by people, or better yet, that become transparent to people (e.g., fully integrated into a user's experience such that the user does not explicitly notice the presence of the system), and are focused on providing better experiences in general.

It is desirable that mixed reality, or augmented reality, near-eye displays be lightweight, low-cost, have a small form-factor, have a wide virtual image field of view, and be as transparent as possible. In addition, it is desirable in certain embodiments to have configurations that present virtual image information in multiple focal planes (for example, two or more) in order to be practical for a wide variety of use-cases without exceeding an acceptable allowance for vergence-accommodation mismatch. Referring to FIG. 1, an augmented reality system is illustrated featuring a head-worn viewing component (2), a hand-held controller component (4), and an interconnected auxiliary computing or controller component (6) which may be configured to be worn as a belt pack or the like on the user. Each of these components may be operatively coupled (10, 12, 14, 16, 17, 18) to each other and to other connected resources (8) such as cloud computing or cloud storage resources via wired or wireless communication configurations, such as those specified by IEEE 802.11, Bluetooth®, and other connectivity standards and configurations. As described, for example, in U.S. patent application Ser. Nos. 14/555,585, 14/690,401, 14/331,218, 15/481,255, and 62/518,539, each of which is incorporated by reference herein in its entirety, various aspects of such components are described, such as various embodiments of the two depicted optical elements (20) through which the user may see the world around them along with visual components which may be produced by the associated system components, for an augmented reality experience. There is a need for highly capable systems and assemblies which are optimized for use in wearable computing systems. In certain embodiments, such systems and subsystems may be configured for and utilized for certain "artificial intelligence" related tasks.

Various components can be used in connection with providing an augmented reality or mixed reality experience to a user. For example, as illustrated in FIG. 1, a see-through wearable display system can be capable of presenting to the user a combination of views of the physical world around the user, along with combined virtual content in the user's visual field in a perceptually meaningful way. With the same system (i.e., such as that depicted in FIG. 1) a spatial computing platform can be used to receive information regarding, or "perceive", various physical aspects pertaining to the environment and viewer simultaneously. By combining the wearable computing display with a machine learning powered spatial computing platform, a feedback loop can be established between the user and the experience.

Mixed Reality Environment

Like all people, a user of a mixed reality system exists in a real environment that is, a three-dimensional portion of the "real world," and all of its contents, that are perceptible by the user. For example, a user perceives a real environment using one's ordinary human senses sight, sound, touch, taste, smell and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate for instance, an audio signal corresponding to a composite of sounds in the virtual environment, and mixed and processed to simulate an audio signal that would be heard by a listener at the listener coordinate and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the head-mounted wearable unit. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus a prickly inanimate object a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment because, as noted above, a user cannot directly perceive or interact with a virtual environment a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

Figure 2A:
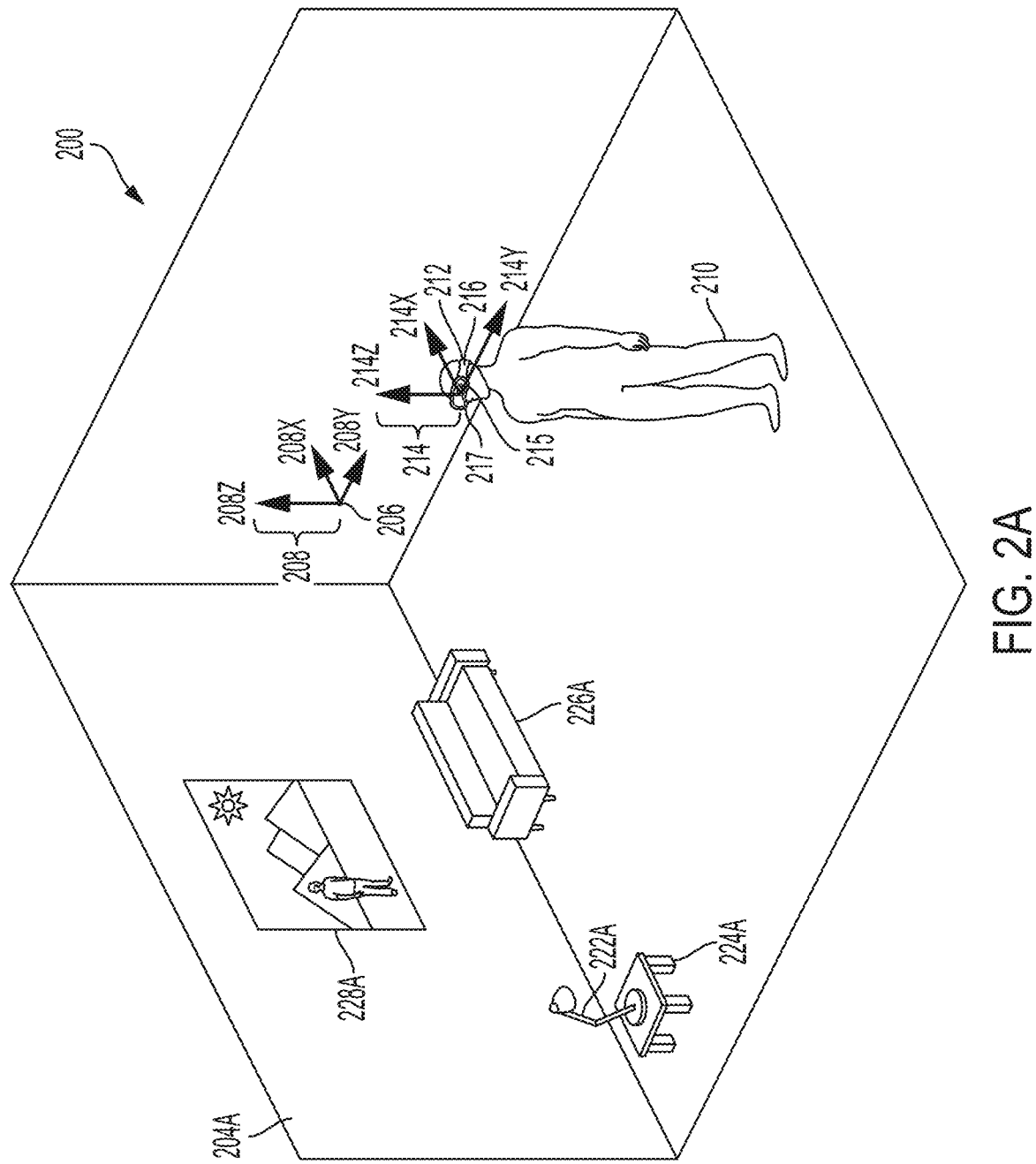
FIGS. 2A-2C illustrate an example mixed reality environment, according to one or more embodiments of the disclosure.

FIG. 2A illustrates an example real environment 200 in which a user 210 uses a mixed reality system 212. Mixed reality system 212 may comprise a display (e.g., a transmissive display) and one or more speakers, and one or more sensors (e.g., a camera), for example as described below. The real environment 200 shown comprises a rectangular room 204A, in which user 210 is standing; and real objects 222A (a lamp), 224A (a table), 226A (a sofa), and 228A (a painting). Room 204A further comprises a location coordinate 206, which may be considered an origin of the real environment 200. As shown in FIG. 2A, an environment/world coordinate system 208 (comprising an x-axis 208X, a y-axis 208Y, and a z-axis 208Z) with its origin at point 206 (a world coordinate), can define a coordinate space for real environment 200. In some embodiments, the origin point 206 of the environment/world coordinate system 208 may correspond to where the mixed reality system 212 was powered on. In some embodiments, the origin point 206 of the environment/world coordinate system 208 may be reset during operation. In some examples, user 210 may be considered a real object in real environment 200; similarly, user 210's body parts (e.g., hands, feet) may be considered real objects in real environment 200. In some examples, a user/listener/head coordinate system 214 (comprising an x-axis 214X, a y-axis 214Y, and a z-axis 214Z) with its origin at point 215 (e.g., user/listener/head coordinate) can define a coordinate space for the user/listener/head on which the mixed reality system 212 is located. The origin point 215 of the user/listener/head coordinate system 214 may be defined relative to one or more components of the mixed reality system 212. For example, the origin point 215 of the user/listener/head coordinate system 214 may be defined relative to the display of the mixed reality system 212 such as during initial calibration of the mixed reality system 212. A matrix (which may include a translation matrix and a Quaternion matrix or other rotation matrix), or other suitable representation can characterize a transformation between the user/listener/head coordinate system 214 space and the environment/world coordinate system 208 space. In some embodiments, a left ear coordinate 216 and a right ear coordinate 217 may be defined relative to the origin point 215 of the user/listener/head coordinate system 214. A matrix (which may include a translation matrix and a Quaternion matrix or other rotation matrix), or other suitable representation can characterize a transformation between the left ear coordinate 216 and the right ear coordinate 217, and user/listener/head coordinate system 214 space. The user/listener/head coordinate system 214 can simplify the representation of locations relative to the user's head, or to a head-mounted device, for example, relative to the environment/world coordinate system 208. Using Simultaneous Localization and Mapping (SLAM), visual odometry, or other techniques, a transformation between user coordinate system 214 and environment coordinate system 208 can be determined and updated in real-time.

Figure 2B:
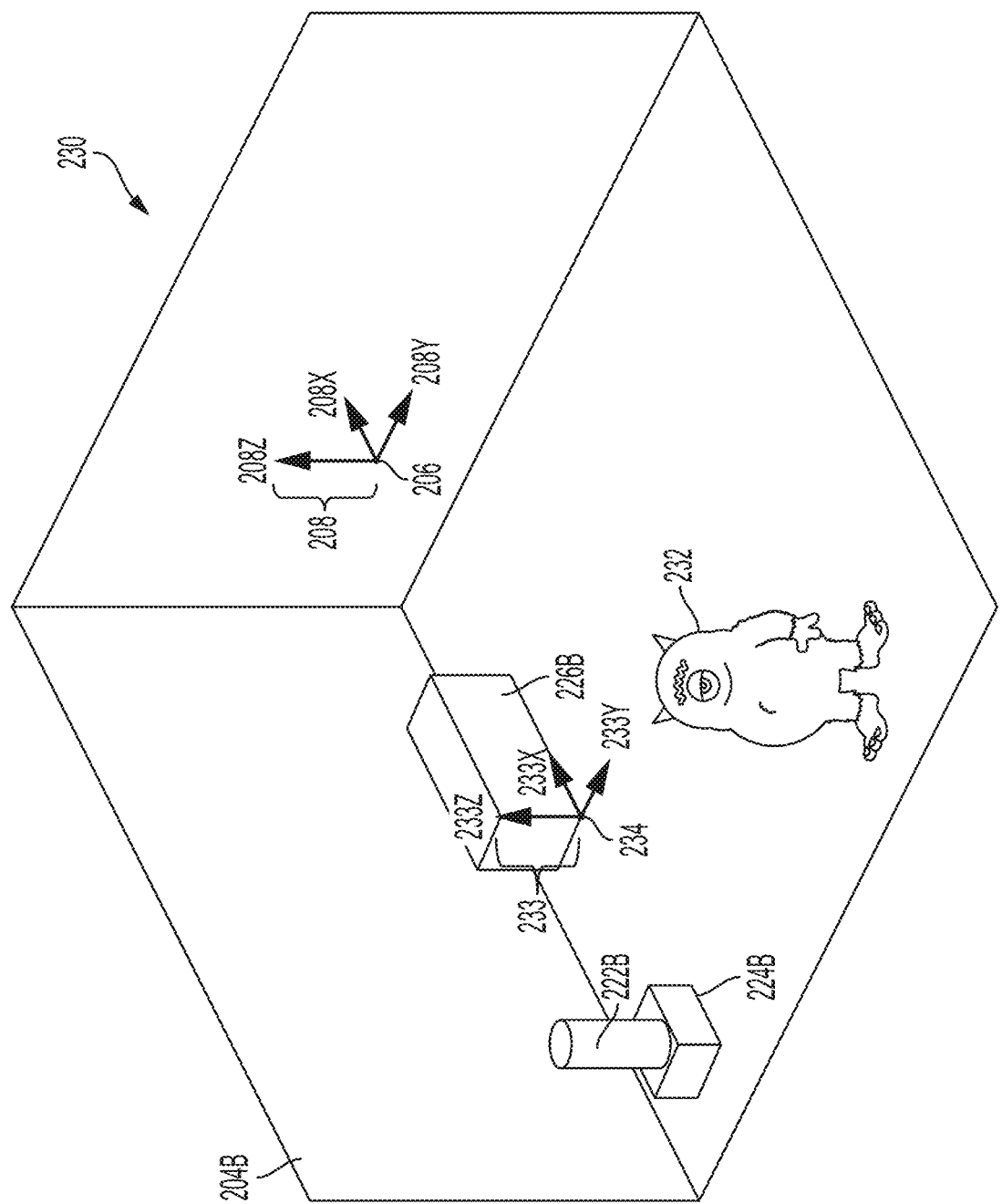

FIG. 2B illustrates an example virtual environment 230 that corresponds to real environment 200. The virtual environment 230 shown comprises a virtual rectangular room 204B corresponding to real rectangular room 204A; a virtual object 222B corresponding to real object 222A; a virtual object 224B corresponding to real object 224A; and a virtual object 226B corresponding to real object 226A. Metadata associated with the virtual objects 222B, 224B, 226B can include information derived from the corresponding real objects 222A, 224A, 226A. Virtual environment 230 additionally comprises a virtual monster 232, which does not correspond to any real object in real environment 200. Real object 228A in real environment 200 does not correspond to any virtual object in virtual environment 230. A persistent coordinate system 233 (comprising an x-axis 233X, a y-axis 233Y, and a z-axis 233Z) with its origin at point 234 (persistent coordinate), can define a coordinate space for virtual content. The origin point 234 of the persistent coordinate system 233 may be defined relative/with respect to one or more real objects, such as the real object 226A. A matrix (which may include a translation matrix and a Quaternion matrix or other rotation matrix), or other suitable representation can characterize a transformation between the persistent coordinate system 233 space and the environment/world coordinate system 208 space. In some embodiments, each of the virtual objects 222B, 224B, 226B, and 232 may have their own persistent coordinate point relative to the origin point 234 of the persistent coordinate system 233. In some embodiments, there may be multiple persistent coordinate systems and each of the virtual objects 222B, 224B, 226B, and 232 may have their own persistent coordinate point relative to one or more persistent coordinate systems.

With respect to FIGS. 2A and 2B, environment/world coordinate system 208 defines a shared coordinate space for both real environment 200 and virtual environment 230. In the example shown, the coordinate space has its origin at point 206. Further, the coordinate space is defined by the same three orthogonal axes (208X, 208Y, 208Z). Accordingly, a first location in real environment 200, and a second, corresponding location in virtual environment 230, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 2C:
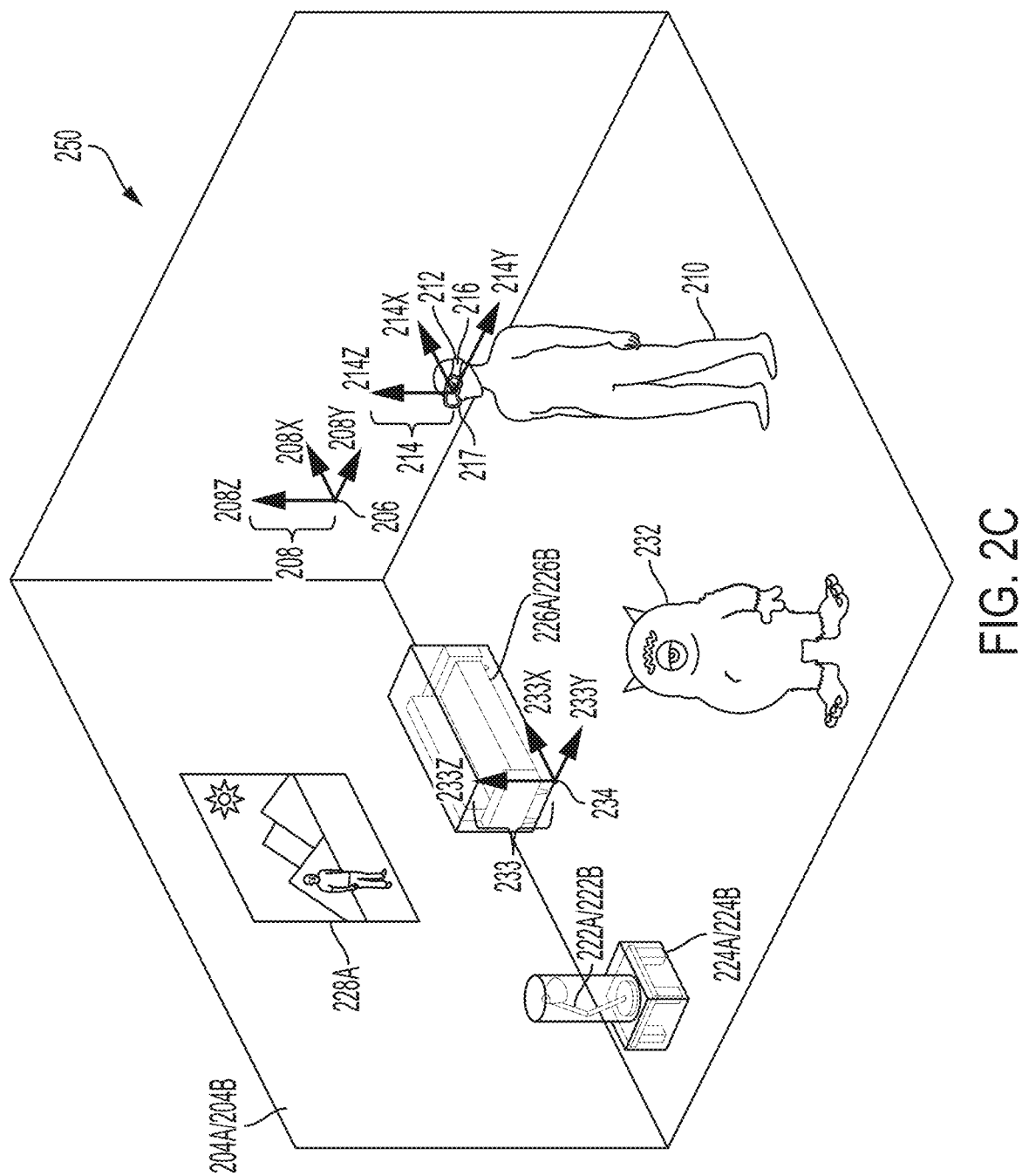

FIG. 2C illustrates an example MRE 250 that simultaneously presents aspects of real environment 200 and virtual environment 230 to user 210 via mixed reality system 212. In the example shown, MRE 250 simultaneously presents user 210 with real objects 222A, 224A, 226A, and 228A from real environment 200 (e.g., via a transmissive portion of a display of mixed reality system 212); and virtual objects 222B, 224B, 226B, and 232 from virtual environment 230 (e.g., via an active display portion of the display of mixed reality system 212). As above, origin point 206 acts as an origin for a coordinate space corresponding to MRE 250, and coordinate system 208 defines an x-axis, y-axis, and z-axis for the coordinate space.

In the example shown, mixed reality objects comprise corresponding pairs of real objects and virtual objects (i.e., 222A/222B, 224A/224B, 226A/226B) that occupy corresponding locations in coordinate space 208. In some examples, both the real objects and the virtual objects may be simultaneously visible to user 210. This may be desirable in, for example, instances where the virtual object presents information designed to augment a view of the corresponding real object (such as in a museum application where a virtual object presents the missing pieces of an ancient damaged sculpture). In some examples, the virtual objects (222B, 224B, and/or 226B) may be displayed (e.g., via active pixelated occlusion using a pixelated occlusion shutter) so as to occlude the corresponding real objects (222A, 224A, and/or 226A). This may be desirable in, for example, instances where the virtual object acts as a visual replacement for the corresponding real object (such as in an interactive storytelling application where an inanimate real object becomes a "living" character).

In some examples, real objects (e.g., 222A, 224A, 226A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MRE 250, virtual monster 232 could be associated with one or more audio signals, such as a footstep sound effect that is generated as the monster walks around MRE 250. As described further below, a processor of mixed reality system 212 can compute an audio signal corresponding to a mixed and processed composite of all such sounds in MRE 250, and present the audio signal to user 210 via one or more speakers included in mixed reality system 212 and/or one or more external speakers.

Example Mixed Reality System

Example mixed reality system 212 can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU)(e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 212 can incorporate any suitable display technology, and any suitable sensors (e.g., optical, infrared, acoustic, LIDAR, EOG, GPS, magnetic). In addition, mixed reality system 212 may incorporate networking features (e.g., Wi-Fi capability) to communicate with other devices and systems, including other mixed reality systems. Mixed reality system 212 may further include a battery (which may be mounted in an auxiliary unit, such as a belt pack designed to be worn around a user's waist), a processor, and a memory. The wearable head device of mixed reality system 212 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 212 may also include a handheld controller 400, and/or an auxiliary unit 420, which may be a wearable beltpack, as described further below.

Figure 3A:
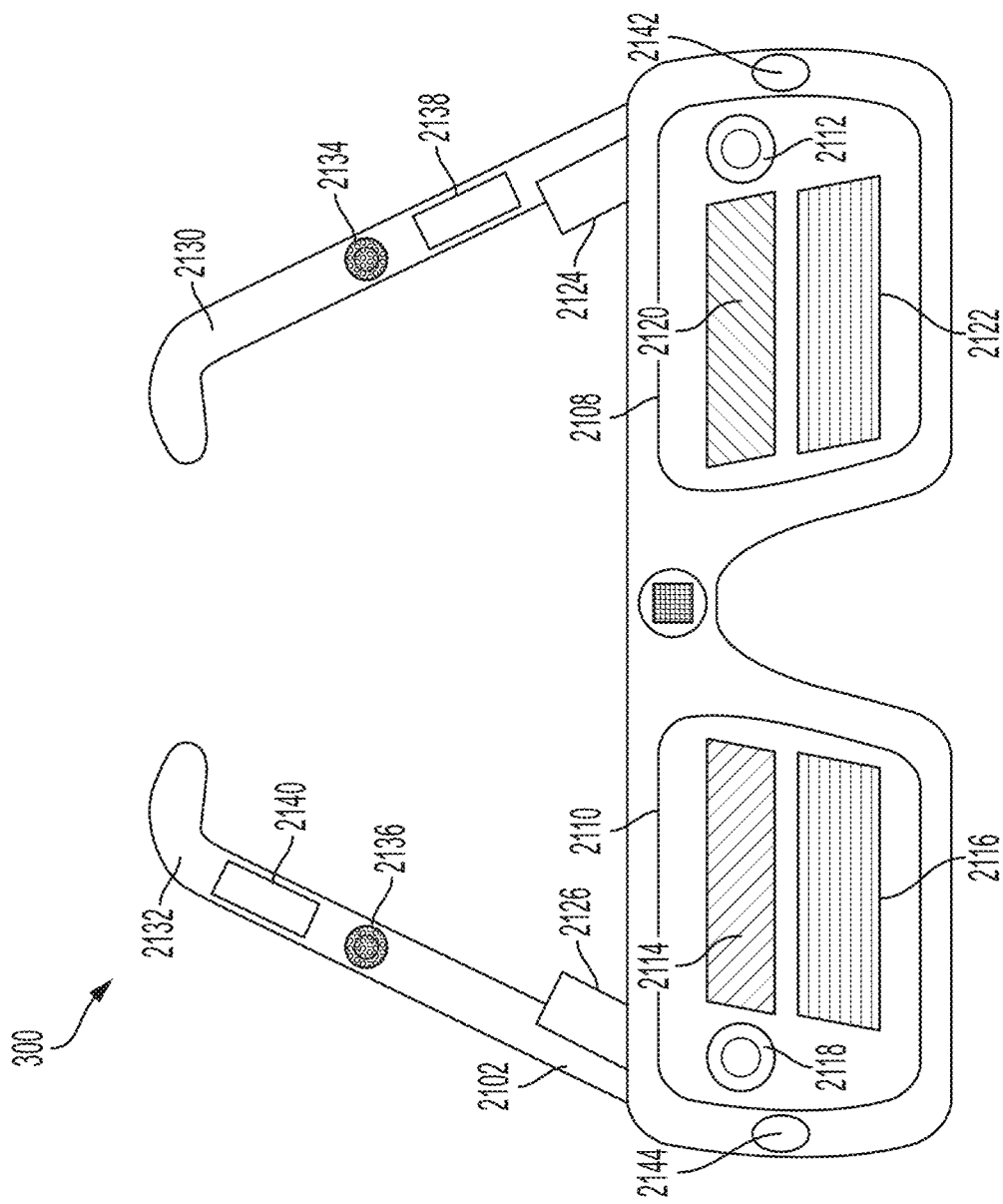
FIGS. 3A-3D illustrate components of an example mixed reality system that can be used to generate and interact with a mixed reality environment, according to one or more embodiments of the disclosure.
Figure 3B:
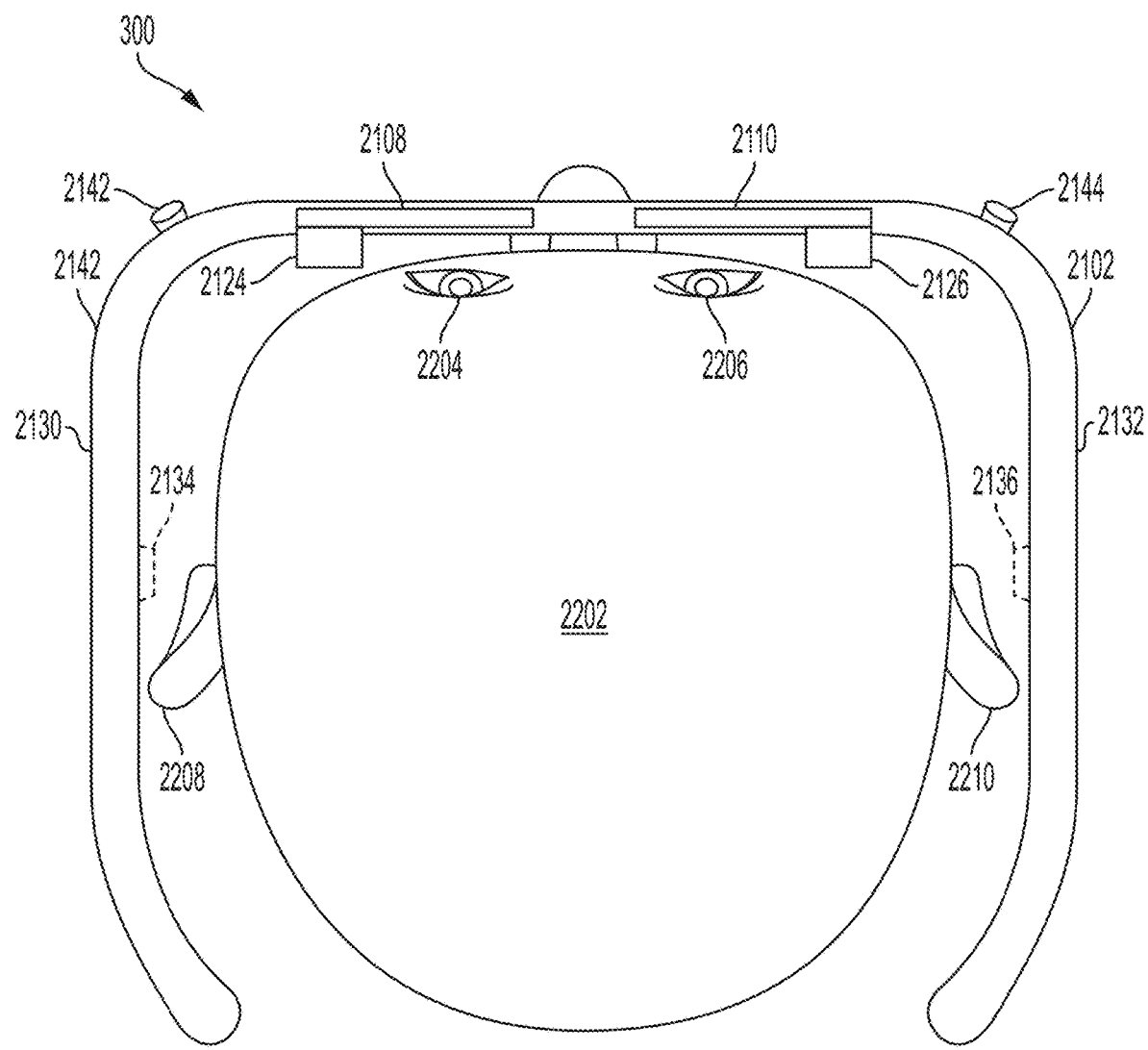
Figure 3C:
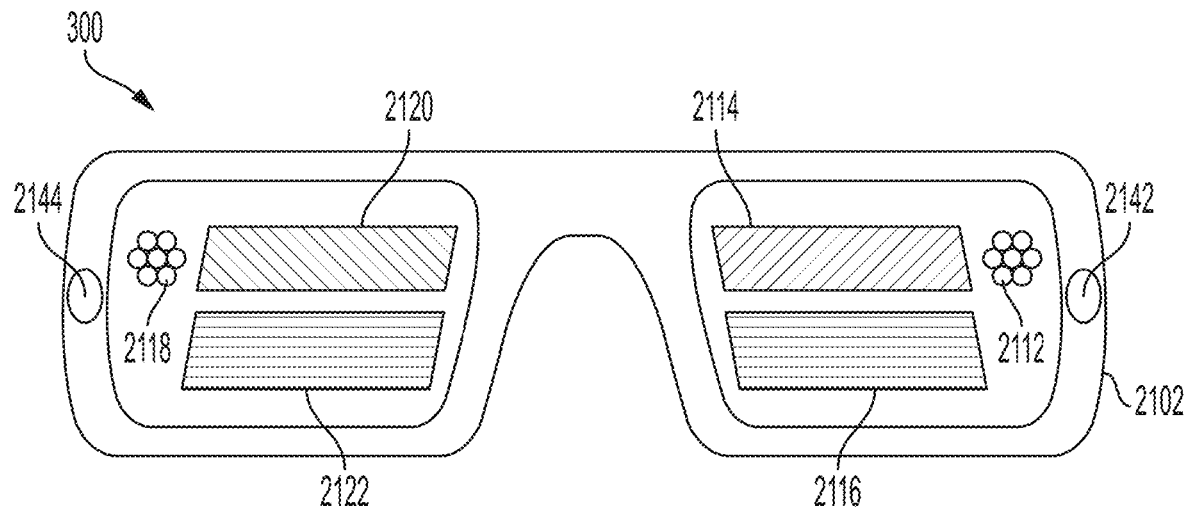
Figure 3D:
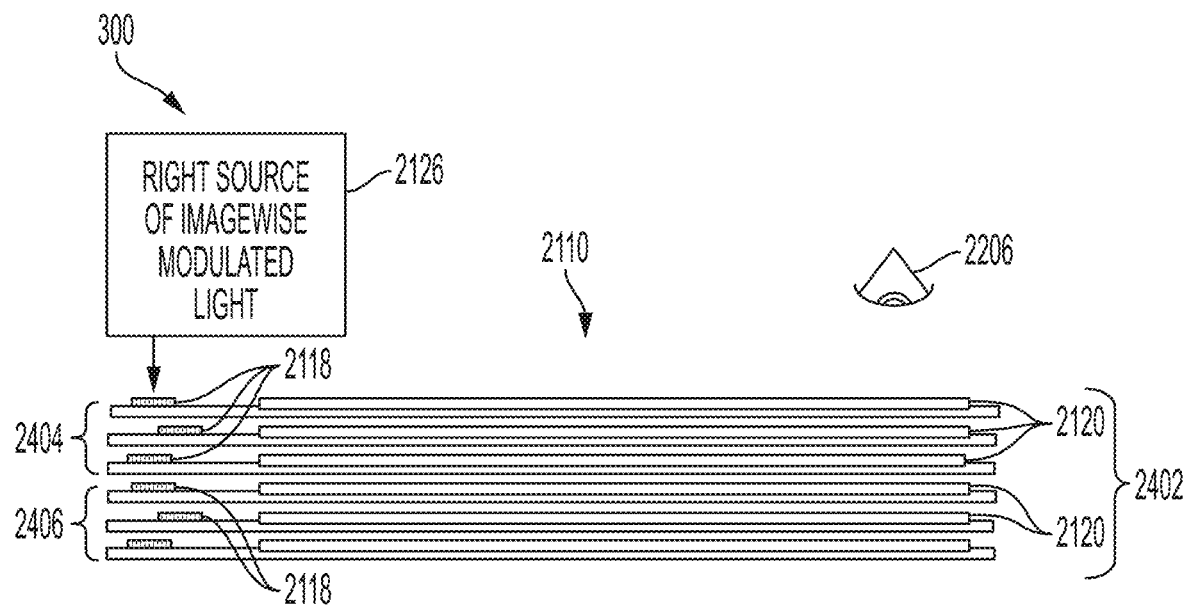

FIGS. 3A-3D illustrate components of an example mixed reality system 300 (which may correspond to mixed reality system 212) that may be used to present a MRE (which may correspond to MRE 250), or other virtual environment, to a user. FIG. 3A illustrates a perspective view of a wearable head device 2102 included in example mixed reality system 300. FIG. 3B illustrates a top view of wearable head device 2102 worn on a user's head 2202. FIG. 3C illustrates a front view of wearable head device 2102. FIG. 3D illustrates an edge view of example eyepiece 2110 of wearable head device 2102. As shown in FIGS. 3A-3C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 3A-3D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (μLED) or micro Organic Light Emitting Diode (μOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 3D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 3D illustrates an edge-facing view from the top of the right eyepiece 2110 of example wearable head device 2102. As shown in FIG. 3D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 3D, the structure of the left eyepiece 2108 is analogous to the structure of the right eyepiece 2110.)

Figure 4A:
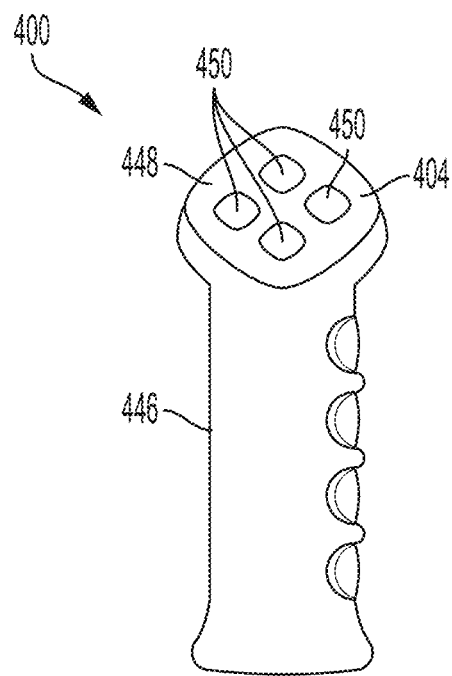
FIG. 4A illustrates an example mixed reality handheld controller that can be used to provide input to a mixed reality environment, according to one or more embodiments of the disclosure.

FIG. 4A illustrates an example handheld controller component 400 of a mixed reality system 300. In some examples, handheld controller 400 includes a grip portion 446 and one or more buttons 450 disposed along a top surface 448. In some examples, buttons 450 may be configured for use as an optical tracking target, e.g., for tracking six-degree-of-freedom (6DOF) motion of the handheld controller 400, in conjunction with a camera or other optical sensor (which may be mounted in a head unit (e.g., wearable head device 2102) of mixed reality system 300). In some examples, handheld controller 400 includes tracking components (e.g., an IMU or other suitable sensors) for detecting position or orientation, such as position or orientation relative to wearable head device 2102. In some examples, such tracking components may be positioned in a handle of handheld controller 400, and/or may be mechanically coupled to the handheld controller. Handheld controller 400 can be configured to provide one or more output signals corresponding to one or more of a pressed state of the buttons; or a position, orientation, and/or motion of the handheld controller 400 (e.g., via an IMU). Such output signals may be used as input to a processor of mixed reality system 300. Such input may correspond to a position, orientation, and/or movement of the handheld controller (and, by extension, to a position, orientation, and/or movement of a hand of a user holding the controller). Such input may also correspond to a user pressing buttons 450.

Figure 4B:
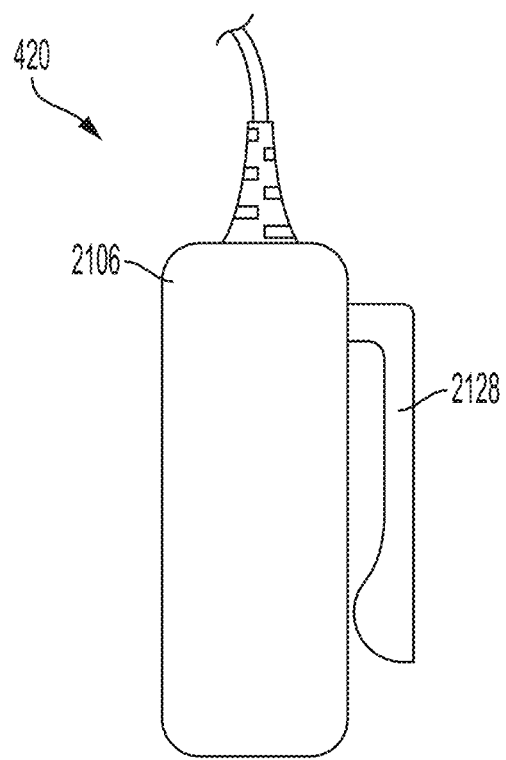
FIG. 4B illustrates an example auxiliary unit that can be used with an example mixed reality system, according to one or more embodiments of the disclosure.

FIG. 4B illustrates an example auxiliary unit 420 of a mixed reality system 300. The auxiliary unit 420 can include a battery to provide energy to operate the system 300, and can include a processor for executing programs to operate the system 300. As shown, the example auxiliary unit 420 includes a clip 2128, such as for attaching the auxiliary unit 420 to a user's belt. Other form factors are suitable for auxiliary unit 420 and will be apparent, including form factors that do not involve mounting the unit to a user's belt. In some examples, auxiliary unit 420 is coupled to the wearable head device 2102 through a multiconduit cable that can include, for example, electrical wires and fiber optics. Wireless connections between the auxiliary unit 420 and the wearable head device 2102 can also be used.

In some examples, mixed reality system 300 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 400 and/or auxiliary unit 420. Such a microphone may be configured to detect environmental sounds, ambient noise, voices of a user or a third party, or other sounds.

Figure 5:
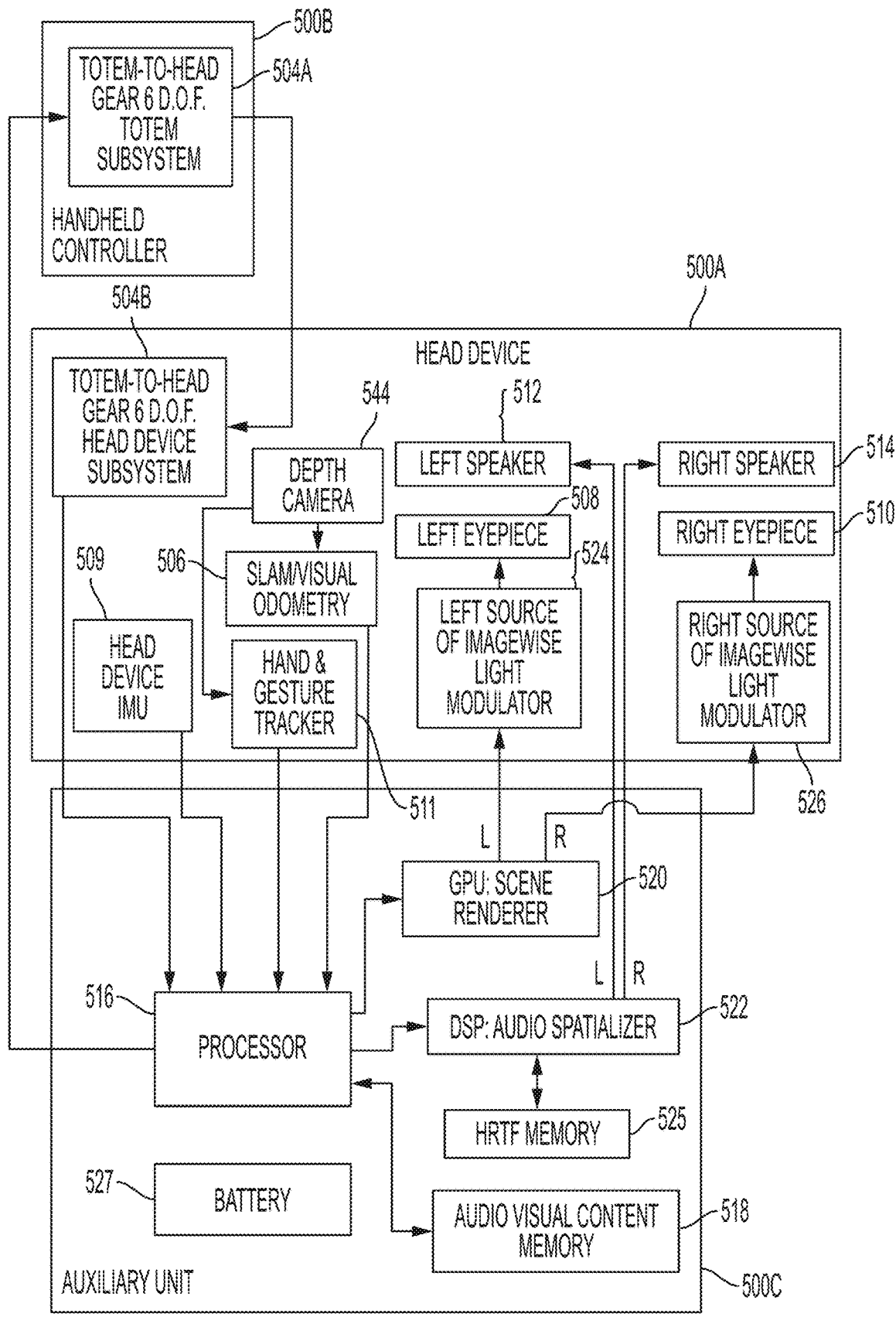
FIG. 5 illustrates an example functional block diagram for an example mixed reality system, according to one or more embodiments of the disclosure.

FIG. 5 shows an example functional block diagram that may correspond to an example mixed reality system, such as mixed reality system 300 described above (which may correspond to mixed reality system 212 with respect to FIG. 2A). As shown in FIG. 5, example handheld controller 500B (which may correspond to handheld controller 400 (a "totem")) includes a totem-to-wearable head device six degree of freedom (6DOF) totem subsystem 504A and example wearable head device 500A (which may correspond to wearable head device 2102) includes a totem-to-wearable head device 6DOF subsystem 504B. In the example, the 6DOF totem subsystem 504A and the 6DOF subsystem 504B cooperate to determine six coordinates (e.g., offsets in three translation directions and rotation along three axes) of the handheld controller 500B relative to the wearable head device 500A. The six degrees of freedom may be expressed relative to a coordinate system of the wearable head device 500A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 500A; one or more depth cameras 544 (and/or one or more non-depth cameras) included in the wearable head device 500A; and/or one or more optical targets (e.g., buttons 450 of handheld controller 500B as described above, or dedicated optical targets included in the handheld controller 500B) can be used for 6DOF tracking. In some examples, the handheld controller 500B can include a camera, as described above; and the wearable head device 500A can include an optical target for optical tracking in conjunction with the camera. In some examples, the wearable head device 500A and the handheld controller 500B each include a set of three orthogonally oriented solenoids which are used to wirelessly send and receive three distinguishable signals.

By measuring the relative magnitude of the three distinguishable signals received in each of the coils used for receiving, the 6DOF of the wearable head device 500A relative to the handheld controller 500B may be determined. Additionally, 6DOF totem subsystem 504A can include an Inertial Measurement Unit (IMU) that is useful to provide improved accuracy and/or more timely information on rapid movements of the handheld controller 500B.

In some examples, it may become necessary to transform coordinates from a local coordinate space (e.g., a coordinate space fixed relative to the wearable head device 500A) to an inertial coordinate space (e.g., a coordinate space fixed relative to the real environment), for example in order to compensate for the movement of the wearable head device 500A relative to the coordinate system 208. For instance, such transformations may be necessary for a display of the wearable head device 500A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 500A shifts and rotates). In some examples, a compensatory transformation between coordinate spaces can be determined by processing imagery from the depth cameras 544 using a SLAM and/or visual odometry procedure in order to determine the transformation of the wearable head device 500A relative to the coordinate system 208. In the example shown in FIG. 5, the depth cameras 544 are coupled to a SLAM/visual odometry block 506 and can provide imagery to block 506. The SLAM/visual odometry block 506 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 509. Information from the IMU 509 can be integrated with information from the SLAM/visual odometry block 506 to provide improved accuracy and/or more timely information on rapid adjustments of the user's head pose and position.

In some examples, the depth cameras 544 can supply 3D imagery to a hand gesture tracker 511, which may be implemented in a processor of the wearable head device 500A. The hand gesture tracker 511 can identify a user's hand gestures, for example by matching 3D imagery received from the depth cameras 544 to stored patterns representing hand gestures. Other suitable techniques of identifying a user's hand gestures will be apparent.

In some examples, one or more processors 516 may be configured to receive data from the wearable head device's 6DOF headgear subsystem 504B, the IMU 509, the SLAM/visual odometry block 506, depth cameras 544, and/or the hand gesture tracker 511. The processor 516 can also send and receive control signals from the 6DOF totem system 504A. The processor 516 may be coupled to the 6DOF totem system 504A wirelessly, such as in examples where the handheld controller 500B is untethered. Processor 516 may further communicate with additional components, such as an audio-visual content memory 518, a Graphical Processing Unit (GPU) 520, and/or a Digital Signal Processor (DSP) audio spatializer 522. The DSP audio spatializer 522 may be coupled to a Head Related Transfer Function (HRTF) memory 525. The GPU 520 can include a left channel output coupled to the left source of imagewise modulated light 524 and a right channel output coupled to the right source of imagewise modulated light 526. GPU 520 can output stereoscopic image data to the sources of imagewise modulated light 524, 526, for example as described above with respect to FIGS. 3A-3D. The DSP audio spatializer 522 can output audio to a left speaker 512 and/or a right speaker 514. The DSP audio spatializer 522 can receive input from processor 519 indicating a direction vector from a user to a virtual sound source (which may be moved by the user, e.g., via the handheld controller 420). Based on the direction vector, the DSP audio spatializer 522 can determine a corresponding HRTF (e.g., by accessing a HRTF, or by interpolating multiple HRTFs). The DSP audio spatializer 522 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment that is, by presenting a virtual sound that matches a user's expectations of what that virtual sound would sound like if it were a real sound in a real environment.

In some examples, such as shown in FIG. 5, one or more of processor 516, GPU 520, DSP audio spatializer 522, HRTF memory 525, and audio/visual content memory 518 may be included in an auxiliary unit 500C (which may correspond to auxiliary unit 420 described above). The auxiliary unit 500C may include a battery 527 to power its components and/or to supply power to the wearable head device 500A or handheld controller 500B. Including such components in an auxiliary unit, which can be mounted to a user's waist, can limit the size and weight of the wearable head device 500A, which can in turn reduce fatigue of a user's head and neck.

While FIG. 5 presents elements corresponding to various components of an example mixed reality system, various other suitable arrangements of these components will become apparent to those skilled in the art. For example, elements presented in FIG. 5 as being associated with auxiliary unit 500C could instead be associated with the wearable head device 500A or handheld controller 500B. Furthermore, some mixed reality systems may forgo entirely a handheld controller 500B or auxiliary unit 500C. Such changes and modifications are to be understood as being included within the scope of the disclosed examples.

Human-Centered AI

To augment and interact with the real world on a more profound and personal level, a user can expose their data, about the environment and themselves, to a platform (which can correspond to MR systems 212, 300). In various embodiments, the user owns their data, but at least one important use can be in enhancing the user's experiences with the system, so the system may be configured to allow the user to control who gains access to this information and when, allowing the user to share both their virtual and physical data.

Figure 6:
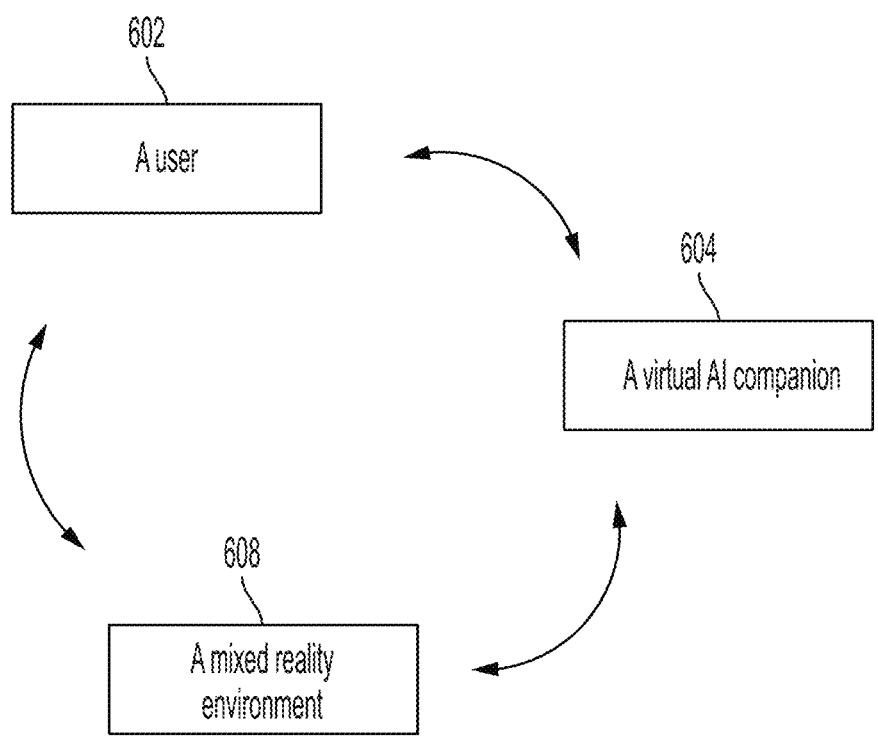
FIG. 6 illustrates an example human centered AI configuration for wearable computing, according to one or more embodiments of the disclosure.

Referring to FIG. 6, in various embodiments, a human centered AI configuration for wearable computing may be built on three foundational pillars: a user 602, an AI companion for the user 604, and the environment or space around the user 606 (which can be a MRE and comprise both a user's physical environment and a user's virtual environment). As the subject AI systems and configurations thereof can be human centered, the user can be the primary focus for such a configuration. In various embodiments, a user can be characterized by their behavior, emotions, preferences, social graph, temperament, and physical attributes. In one embodiment, a virtual AI companion may be characterized by a similar set of attributes, to "make" it more humanized. These may include a personality, memory, knowledge, state, action, and an ability to interact with humans as well as machines (which may be termed "Oz" and may be associated with the concepts of "passable worlds" or portions thereof, as described in the aforementioned incorporated references). Further, similar to how "According to the general theory of relativity space without ether is unthinkable", interactions between the user and the AI may be unthinkable without an environment. Environment may be utilized to dictate context and provide boundaries of the experience. The environment around the user may be parameterized by 3D reconstruction and scene understanding, as well understanding of humans and their interactions. The interactions between these three aforementioned pillars facilitate human centered AI as a platform.

Memory Graphs

Figure 7:
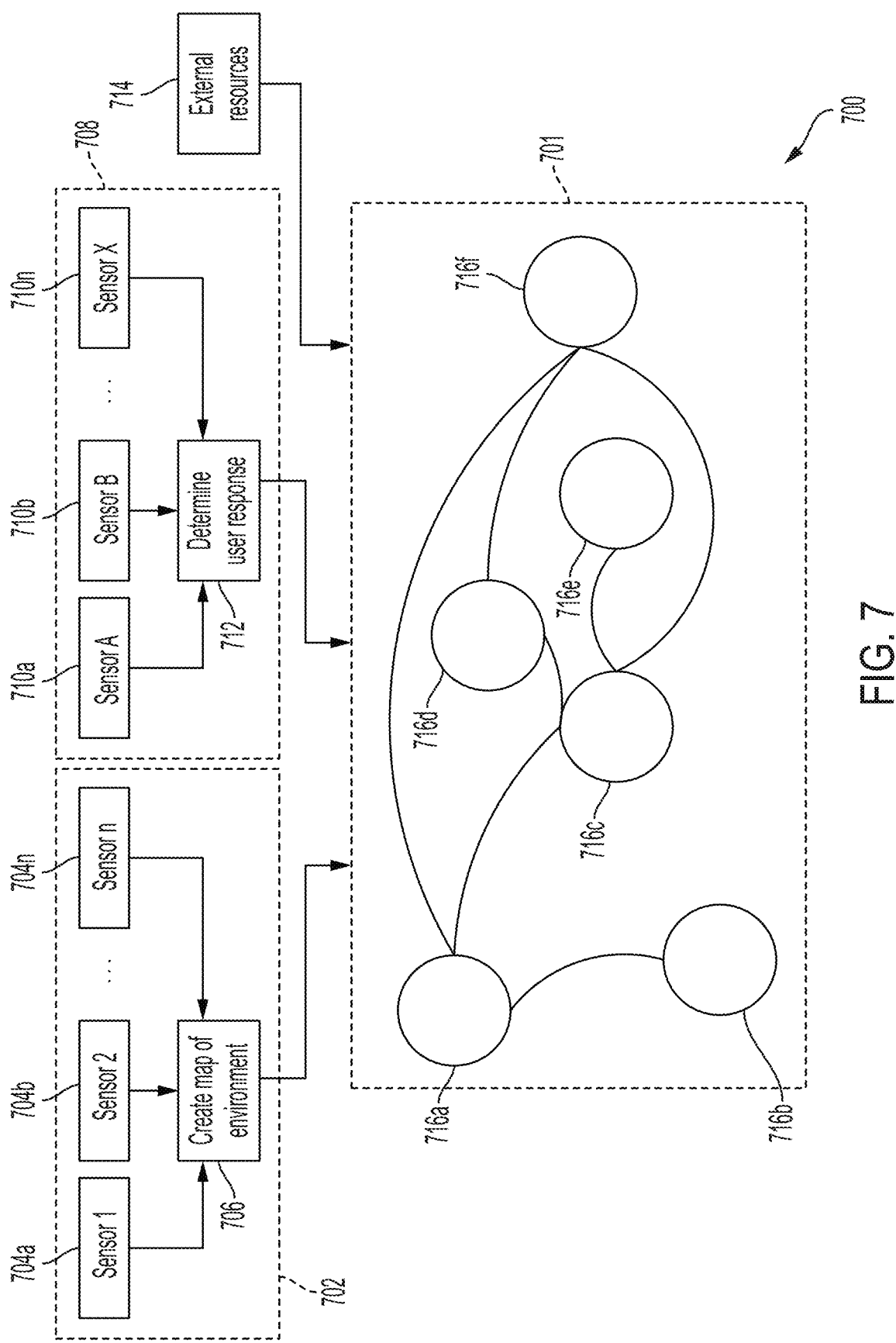
FIG. 7 illustrates an example system for generating a memory graph, according to one or more embodiments of the disclosure.

FIG. 7 depicts an example system 700 for creating an example memory graph 701. Memory graph 701 can comprise one or more nodes 716 that can have one or more associations with other nodes. In some embodiments, a memory graph 701 can represent all information about a user captured by a MR system (e.g., MR system 212, 300). In some embodiments, memory graph 701 can receive inputs from at least three sources: an environment observation module 702, a user observation module 708, and external resources 714.

An exemplary environment observation module 702 can receive one or more sensor inputs 704a-704n. Sensor inputs 704a-704n can comprise inputs for SLAM. SLAM can be used by a MR system (e.g., MR system 212, 300) to identify physical features in a physical environment and locate those physical features relative to the physical environment and relative to each other. Simultaneously, the MR system (e.g., MR system 212, 300) can locate itself within the physical environment and relative to the physical features. SLAM can construct an understanding of a user's physical environment, which can allow a MR system (e.g., MR system 212, 300) to create a virtual environment that respects and interacts with a user's physical environment. For example, for a MR system (e.g., MR system 212, 300) to display a virtual AI companion near a user, it can be desirable for the MR system to identify a physical floor of the user's physical environment and display a virtual human avatar as standing on the physical floor. In some embodiments, as a user walks around a room, a virtual human avatar can move with the user (like a physical companion), and it can be desirable for the virtual human avatar to recognize physical obstacles (e.g., a table) so that the virtual human avatar does not appear to walk through the table. In some embodiments, it can be desirable for a virtual human avatar to appear as sitting down when a user sits down. It can therefore be beneficial for SLAM to recognize a physical object as a chair and recognize dimensions of the chair so that a MR system (e.g., MR system 212, 300) can display the virtual human avatar as sitting in the chair. Integrating a virtual environment displayed to a user with the user's physical environment can create a seamless experience that feels natural to the user, as if the user was interacting with a physical entity.

SLAM can rely on visual input from, for example, one or more cameras using visual odometry. Cameras can capture images of a user's environment, and cameras mounted on a MR system (e.g., MR system 212, 300) can capture images in a direction that a user is looking towards. Images captured by SLAM cameras can be fed into computer vision modules, which can identify features captured by SLAM cameras. Identified features can be tracked across multiple images to determine a feature's location within a physical environment and a user's location and orientation with respect to the feature and/or physical environment. It can be helpful to utilize at least two SLAM cameras located apart from each other such that each SLAM camera can capture images from a different perspective. Such stereoscopic imaging can provide additional depth information regarding a feature's location and orientation in a physical environment.

Other sensor input can assist in SLAM as well. For example, sensor data from an IMU can be used for SLAM using visual-inertial odometry. An IMU can provide information such as acceleration and rotational velocity of a MR system (e.g., MR system 212, 300) and, correspondingly, of a user wearing the MR system. IMU information can be coupled with visual information to determine an identified feature's position and/or orientation in a physical environment. For example, IMU information and visual information can be used to determine a vector for gravity, which can anchor a constructed map of the physical environment. IMU information can also be used to determine how far a user has moved and/or rotated between captured visual frames, providing additional information for locating and positioning features in a physical environment. Additional sensor input that can assist in SLAM can include depth information from, for example, depth sensors, LIDAR sensors, and/or time of flight sensors. These sensors can provide additional information to locate and orient features in a physical environment. Depth information can be particularly helpful when visual sensors capture relatively few features (e.g., an image of a blank wall) to track across multiple images.

In some examples, sensor inputs 704a-704n can comprise other methods to create a map of a user's environment. For example, sensor inputs 704a-704n can comprise input from a GPS sensor and/or a WiFi chip that can geolocate a MR system (e.g., MR system 212, 300). A geolocated MR system can then download pre-existing information about its location and environment from a server based on its location information. For example, a MR system can download a 3D map from an online mapping service based on its location. The pre-existing information may be modified or overwritten based on observations from sensor inputs 704a-704n. Although specific examples are used, it is contemplated that any sensor input that can be captured by a MR system (e.g., MR system 212, 300) and used to determine a user's environment is within the scope of this disclosure. Sensor input 704a-704n can be used to create a map of a user's physical environment at block 706, and this information can be fed into memory graph 701.

An exemplary user observation module 708 can receive one or more sensor inputs 710a-710n (which can correspond to sensor inputs 704a-704n). Sensor inputs 710a-710n can capture information about a user and a user's response to various stimuli in a MRE. In some embodiments, sensor inputs 710a-710n can capture a user's explicit response to various stimuli in a MRE. For example, sensor inputs 710a-710n can comprise an audio signal captured by one or more microphones on a MR system (e.g., MR system 212, 300). In some embodiments, a user can state aloud "I like that," which can be recorded by one or more microphones on a MR system (e.g., MR system 212, 300). The one or more microphones can process the audio signal to transcribe the user's speech, and this transcription can be fed into, for example, a natural language processing unit to determine a meaning behind the spoken words. In some embodiments, a MR system (e.g., MR system 212, 300) can determine that the audio signal originated from a user wearing the MR system. For example, the audio signal can be processed and compared to one or more previous known recordings of the user's voice to determine if the user is the speaker. In other embodiments, two microphones positioned on a MR system (e.g., MR system 212, 300) can be equidistant from a user's mouth; the audio signals captured by the two microphones can therefore contain approximately the same speech signal at approximately the same amplitude, and this information can be used to determine that the user is the speaker.

In some embodiments, sensor inputs 710a-710n can capture other methods that a user may use to explicitly indicate a response to one or more stimuli. For example, a user can perform a "thumbs-up" gesture, which a MR system (e.g., MR system 212, 300) can capture via one or more cameras. The captured images can be processed using computer vision methods to determine that the user performed a thumbs-up gesture, and a MR system (e.g., MR system 212, 300) can determine that the user is indicating approval through the gesture. The gesture can either be prompted or unprompted by the system. A prompted gesture can include the system indicating that the user can perform a particular gesture if the user likes the stimuli. In another example, a user can press a button on a controller, which can be part of a MR system (e.g., MR system 212, 300). In another example, a user can nod their head. A MR system (e.g., MR system 212, 300) can capture this information using, for example, cameras and/or an IMU and determine that the user is indicating approval. Although specific examples are used, it is contemplated that any explicit response that can be captured by a MR system (e.g., MR system 212, 300) is within the scope of this disclosure.

Sensor inputs 710a-710n can also capture a user's implicit response to various stimuli in a MRE. For example, sensor inputs 710a-710n can capture information about a user's gaze to determine an extent to which a user is interested (e.g., an eye-tracking sensor can determine a direction for the user's gaze, determine what an object the user is looking at, and/or determine a duration of the user's gaze). Sensor inputs 710a-710n can comprise inputs from one or more outward facing cameras mounted on a MR system (e.g., MR system 212, 300) that can capture information on physical objects in a user's field of view. Sensor inputs 710a-710n can further comprise inputs from one or more inward facing cameras mounted on a MR system (e.g., MR system 212, 300) that can capture information on a user's eye movements. These inputs can be combined to determine a user's gaze and what a user is looking at in a MRE (e.g., what physical and/or virtual objects a user is looking at). In some embodiments, a MR system (e.g., MR system 212, 300) can determine how long a user is looking at a physical or virtual object and determine a level of interest. For example, if the user gazes at a physical or virtual object for a long time, a MR system (e.g., MR system 212, 300) can determine a high level of interest. In another example, one or more inward facing cameras mounted on a MR system (e.g., MR system 212, 300) can capture information on a user's mouth movements. If a user is smiling, a MR system (e.g., MR system 212, 300) can determine a level of affinity based on the user's mouth movements. In another example, one or more inward facing cameras mounted on a MR system (e.g., MR system 212, 300) can capture information on a user's complexion. If a user's complexion turns red, a MR system (e.g., MR system 212, 300) can determine a level of emotional intensity, and a proper emotion can be determined using other sensor inputs 710a-710n (e.g., whether a user is smiling, whether a user is speaking-including what the user is saying and how loud the user is talking, and/or whether a user is laughing). Implicit responses can also include sounds made by the user, such as laughing, gasping, groaning, and so forth, which can be captured as sensor input and interpreted to determine an emotional state of the user. Although specific examples are used, it is contemplated that any implicit response that can be captured by a MR system (e.g., MR system 212, 300) is within the scope of this disclosure. Sensor input 710a-710n can be used to determine a user response at block 712, and this information can be fed into memory graph 701.

External resources 714 can provide further information to memory graph 701. For example, external resources 714 can comprise pre-existing social graphs. Social graphs can represent relations between entities. For example, a social graph may link various works of literature to a common author, a social graph may link various sounds to a common artist, a social graph may link people together (e.g., as colleagues, friends, or family), a social graph may link images together (e.g., as all images of the Washington Monument, or all images of dogs), etc. Social graphs can be pulled from social media sites, web-crawling algorithms, or any available source. Social graphs can also be created and/or modified by a MR system (e.g., MR system 212, 300) using sensor inputs (e.g., sensor inputs 704a-704n and/or sensor inputs 710a-710n). External resources can also comprise other forms of information. For example, external resources 714 can comprise a connected email account, which can provide access to a user's email contents. External resources 714 can be fed into memory graph 701.

Environment observation module 702, user observation module 708, and external resources 714 can be used to create an exemplary memory graph 701, as shown in FIG. 7. Exemplary memory graph 701 can comprise one or more nodes 716. Nodes 716 can represent physical objects, virtual objects, events, actions, sounds, user responses, and/or generally any experience that a user may encounter. Nodes 716 can be connected to one or more nodes, and these connections can represent any way the nodes may be linked to each other. The connections can represent spatial connections (e.g., a table and a chair are located near each other), temporal connections (e.g., the rain stopped and the user went for a run shortly after), semantic connections (e.g., an identified person is a coworker with the user), or any other connections.

A memory graph can represent all known and/or learned information about a user, and how that information relates to itself and other information. For example, node 716c can represent a user's previous vacation to London. Node 716c can be generated using sensor input 704a-704n (e.g., a GPS sensor identifies that a user wearing a MR system is in London, and/or a camera identifies London landmarks like Buckingham Palace), and/or external resources 714 (e.g., a connected email account contains travel itineraries including flights to and from London and/or a hotel itinerary in London). Node 716e can represent a hotel that the user stayed at during the user's London trip, and Node 716e can be connected to node 716c via a spatial (e.g., the hotel is located in London), temporal (e.g., the user was at the hotel while the user was visiting London), semantic (e.g., the hotel has the word "London" in its name), and/or other connection. Node 716d can represent a soccer game that the user attended during the user's trip to London, and node 716f can represent a soccer team that played during the soccer game. Node 716d can be connected to node 716c via a spatial (e.g., the stadium is located in London), temporal (e.g., the user was at the stadium while the user was visiting London), semantic, and/or other connection. Node 716d can be connected to node 716f via a spatial (e.g., the team was in London), temporal (e.g., the team was in London during the game), semantic (e.g., the team is based in London), and/or other connection. Similarly, node 716f can be connected to node 716c via a spatial (e.g., the user was in the same city as the team), temporal (e.g., the user saw the team play while the user was visiting London), semantic, and/or other connection.

Each node can have an associated user reaction, which can be determined from sensor inputs 710a-710n, and the association can be generated from an environment observation module 702 and/or external resources 714. For example, a MR system (e.g., MR system 212, 300) can observe that the user smiled (e.g., using an inward facing camera), and the user observation module can determine a user reaction (e.g., that the user is happy). The environment observation module 702 and/or external resources 714 can observe that the user has entered their hotel room (e.g., using GPS and/or WiFi information to determine that the user is in the hotel and using visual cameras to determine that the user has entered a room where the number on the door matches the room number provided in the user's email). The information provided by the user observation module 708 can be associated with the information provided by the environment observation module 702 and/or external resources 714 based on, for example, their temporal relationship. If it is determined that the user smiled when the user entered their room, it can be determined that the user is pleased with the hotel. The association between the user reaction and a node can be a temporal association (e.g., the reaction occurred temporally adjacent to an event represented by a node), a spatial association (e.g., the reaction occurred when the user was physically adjacent to a location represented by a node or when the user was physical near an object represented by a node), or any other association or combination of associations.

Connections between nodes can be weighted based on the degree that the nodes are connected, and/or weighted based on a user's reaction to an associated node. For example, if it is determined that a user particularly enjoyed an event represented by a node, connected nodes may have their connections weighted higher. In some embodiments, a negative reaction by a user can result in one or more associated connections becoming weighted higher (e.g., for a virtual companion to recommend that a user avoid a certain object/event/experience) or lower (e.g., to avoid recommending that a user try a certain object/event/experience).

Presenting a Virtual Companion in a MRE

Figure 8:
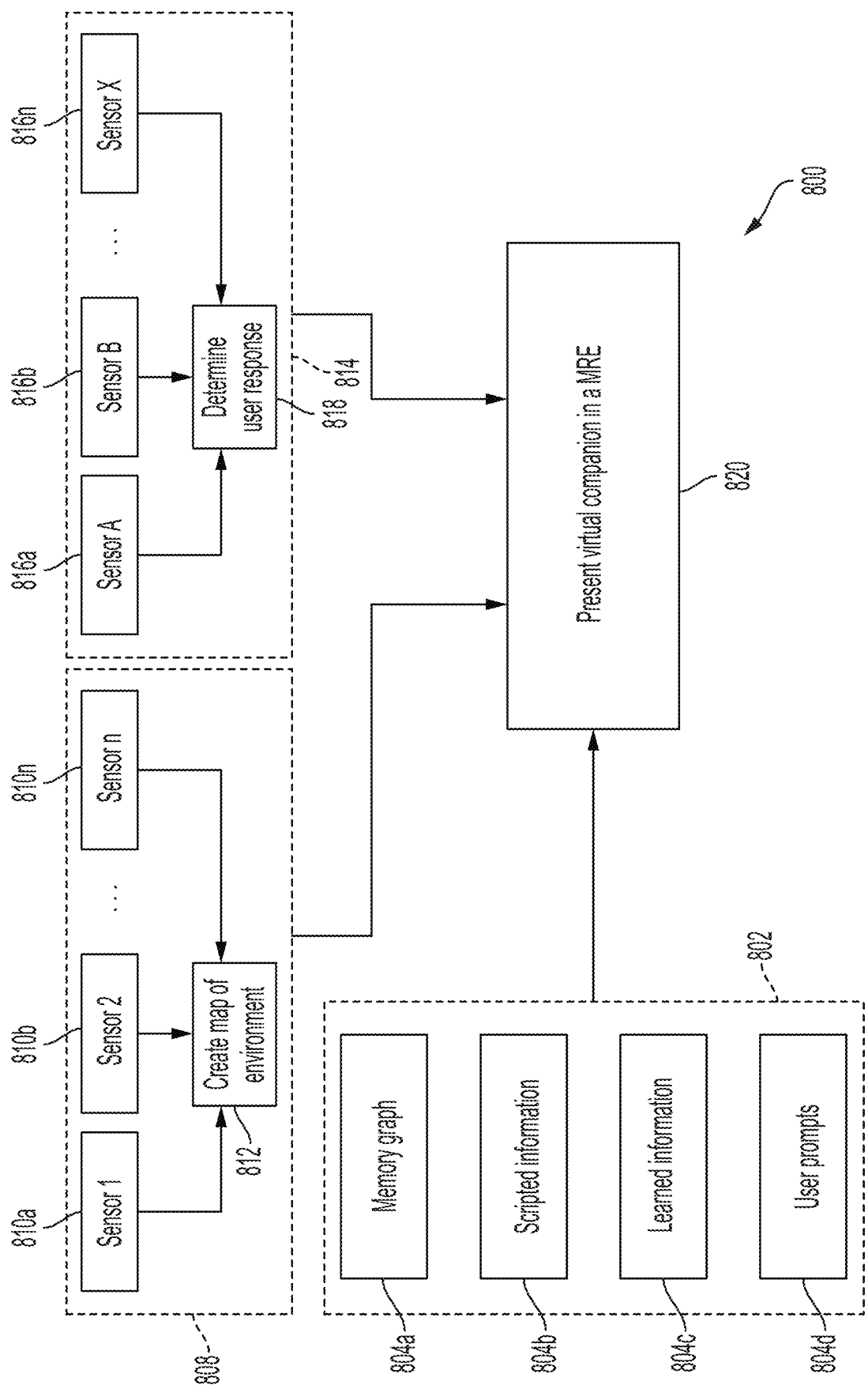
FIG. 8 illustrates an example system for presenting a virtual companion in a mixed reality environment, according to one or more embodiments of the disclosure.

FIG. 8 illustrates an example system 800 for presenting a virtual companion to a user in a MRE. Presenting a virtual companion to a user can use information form a database 802 an environment observation module 808 (which can correspond to environment observation module 702), and/or a user observation module 814 (which can correspond to user observation module 708). It can be desirable to utilize information from a MR system (e.g., MR system 212, 300) to present a lifelike virtual companion that respects, inhabits, and interacts with a user's physical environment to create a seamless interaction with virtual content that replicates interactions with physical content. The seamlessness can be a result of a large quantity and variety of sensors that may be present on a MR system (e.g., MR system 212, 300), coupled with an "always-on" nature of a MR system (e.g., a user does not need to deliberately interact with the MR system for the MR system to receive input about the user and the user's environment).

Database 802 can be used to present a virtual companion in a MRE, and database 802 can comprise a variety of information. For example, database 802 can comprise a memory graph 804a (which can correspond to memory graph 701), and memory graph 804a can represent all (or at least a portion of) known and/or learned information about a user. Database 802 can also comprise scripted information 804b. Scripted information 804b can include scripted animations and/or poses that a MR system (e.g., MR system 212, 300) can use to render a virtual companion as a human avatar. For example, scripted information 804b can comprise a recording of a human actor walking, sitting, and running, which can have been animated (e.g., into a mesh animation). Scripted information 804b can also comprise voice recordings of human actors, which can be broken down into linguistic building blocks and used to synthesize a human voice for a virtual companion. Database 802 can also comprise learned information 804c. In some embodiments, learned information 804c can supplement and/or override scripted information 804b. For example, learned information 804c can comprise information that the user speaks in a particular natural language and/or in a particular accent. A MR system (e.g., MR system 212, 300) can learn this language and/or accent through audio recordings of the user speaking (e.g., via machine-learning), and may modify a scripted voice recording and/or generate new voice recordings to synthesize into human speech with an appropriate language and/or accent. Database 802 can further comprise information from user prompts 804d. User prompts 804d can comprise information obtained directly from the user. For example, a virtual companion may ask a user questions as part of an initialization process (e.g., the virtual companion can "introduce" itself to the user, and ask questions that may be typical of an introduction). In some embodiments, some or all of the information contained in 804b-804d may also be represented in memory graph 804a.

Information stored in database 802 can be used to present a large volume of detailed and personalized information to a user. For example, a user can ask a virtual companion "Where did I stay when I went to London last year?" Database 802 and/or memory graph 804a can be queried, and a virtual companion can tell the user what hotel the user stayed at based on information collected on the user.

Environment module 808 can also be used to present a virtual companion in a MRE in a seamless manner, such that the virtual companion appears as a real companion in the real environment. For example, environment module 808 can determine the presence of an empty chair near the user. When the user sits down, a MR system (e.g., MR system 212, 300) can display a human avatar as inhabiting the same space as the user and sitting down in the empty chair as well. Similarly, when a user walks around, a human avatar can be displayed as moving with the user, and the human avatar can be displayed as avoiding physical obstacles like a chair, and generally respecting the physical environment (e.g., traversing up a set of stairs instead of walking through them).

User observation module 814 can also be used to present a virtual companion in a MRE in a seamless manner, such that the presented emotional state of the virtual companion mirrors (or at least approximates) that of the user, determined as described above based on explicit and/or implicit cues from the user. For example, user observation module 814 can determine a user's general mood (e.g., determining that a user is happy based on an inward facing camera that captures information about the user smiling), and the virtual companion can mirror the user's behavior (e.g., the virtual companion can also be displayed as smiling).

In some embodiments, database 802, environment observation module 808, and user observation module 814 can provide information that can be combined to present a seamless virtual companion experience in the MRE that the user inhabits. In some embodiments, sensors on a MR system (e.g., MR system 212, 300) allow a virtual companion to present information in a user's MRE, in some instances without requiring any prompting from the user. For example, a MR system (e.g., MR system 212, 300) can determine that a user is discussing accommodations in London with another person (e.g., microphones on a MR system detect an audio signal that is transcribed and sent to a natural language processor, and cameras on the MR system detect and identify a person in the field of view of the user) and that the user is attempting to recall information (e.g., an inward facing camera on a MR system detects the user's eyes looking upwards). Database 802 can then be accessed and the contextual information be used from the environment observation module 808 and the user observation module 814 to determine which hotel the user stayed at during their previous trip to London. This information can then be presented to the user in real-time in an unobtrusive and accessible manner (e.g., via a virtual text bubble that is displayed to the user, or via an information card held up by a virtual companion). In other embodiments, a virtual companion can present information (learned explicitly and/or implicitly) to a user in their MRE through explicit prompts by the user (e.g., the user may ask the virtual companion where they stayed in London).

In some embodiments, a virtual companion can interact with a user and the user's MRE. For example, a virtual companion can present itself as a virtual avatar of a dog, and the user can play fetch with the virtual companion. The user can throw a virtual or physical stick, and the virtual companion can be presented as moving in the user's inhabited physical environment and respecting obstacles in the physical environment (e.g., by moving around the obstacles). In another example, a MR system (e.g., MR system 212, 300) can connect to other devices (e.g., a smart lightbulb), and the user can request that the virtual companion turn on the lights. A virtual companion that can access data provided by a MR system (e.g., MR system 212, 300) has many benefits. For example, information can be continuously recorded by the MR system without intervention by the user (whether a virtual companion is currently being displayed or not). Similarly, information can be presented to the user without user intervention based on the continuously recorded information.

Examples of Virtual Companions

Figure 9A:
FIGS. 9A-9J illustrate examples of presenting a virtual companion in a mixed reality environment, according to one or more embodiments of the disclosure.
Figure 9B:
Figure 9C:
Figure 9D:
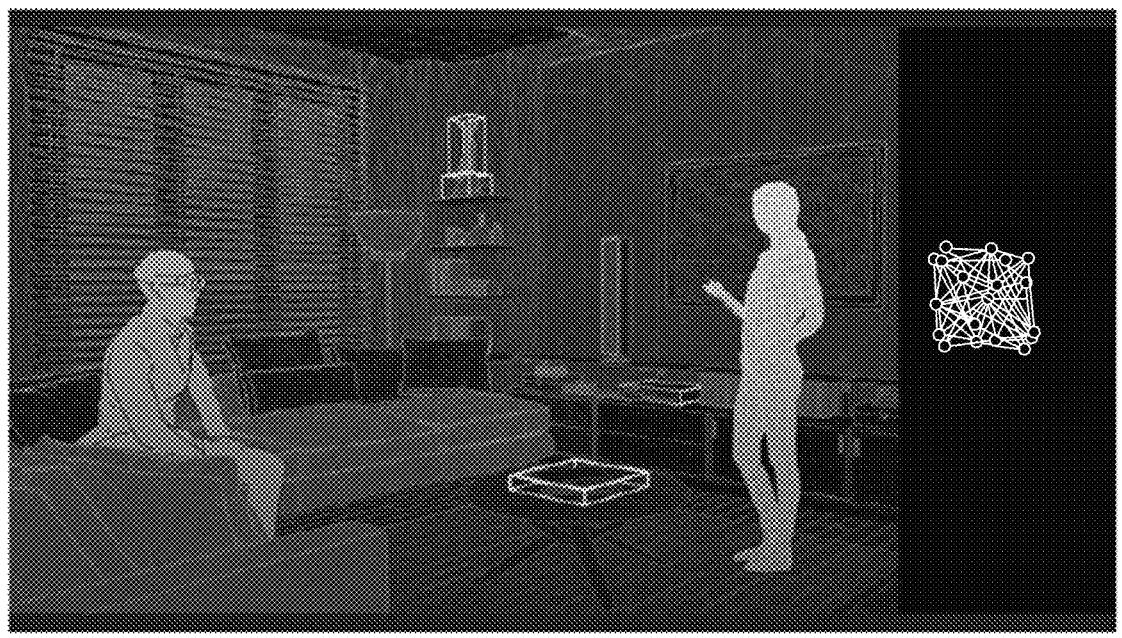
Figure 9E:

Referring to FIG. 9A, a human user ("Alex") is shown sitting on a couch in his real living room; he is wearing a wearable computing system (e.g., MR system 212, 300), and this system creates a mesh of the room and objects around him as shown in FIG. 9B. Also referring to FIG. 9B, a virtual companion (who can be named "Aya") appears, looking a like a hologram in the depicted illustration. Referring to FIGS. 9C-9E, in this embodiment, Aya notices that the room is unusually dark (e.g., via cameras on a MR system 212, 300), drawing on observations of Alex's preferences (e.g., observations stored and associated in a memory graph 701, 804*a*), and turns up the actual/physical lights in the room for Alex (e.g., via a wireless connection to a smart lightbulb). Aya proceeds to scan the environment and understand its context (e.g., using SLAM and sensors on a MR system 212, 300). The scene is segmented, objects are detected, and are stored in Aya's memory, which may be termed a "Lifestream", which is depicted as an association of information nodes to the right of FIGS. 9C-9I. A Lifestream can correspond to memory graph 701, 804*a*. In one embodiment, a Lifestream may be defined as the theoretical perfect data set that captures the total experiential flow of a person (e.g., from birth through death) including both physical and virtual observations and experiences.

Figure 9F:
Figure 9G:
Figure 9H:

Referring to FIG. 9F, Alex looks at Aya and asks: "Aya, what was playing at the Pink Floyd concert last summer that I liked?" Referring to FIG. 9G, Aya queries the Lifestream and retrieves a memory of the concert, and says: "Another brick in the wall" she replies. Referring to FIG. 9H, Alex comments: "Wow that's amazing! I never would've remembered without your help. Can you play it on the TV, please?" Aya gets the music video going on the actual TV in the room, or alternatively can present the video via an augmented reality TV for Alex. Audio may be presented to Alex through his headset or other speakers, for example.

Figure 9I:
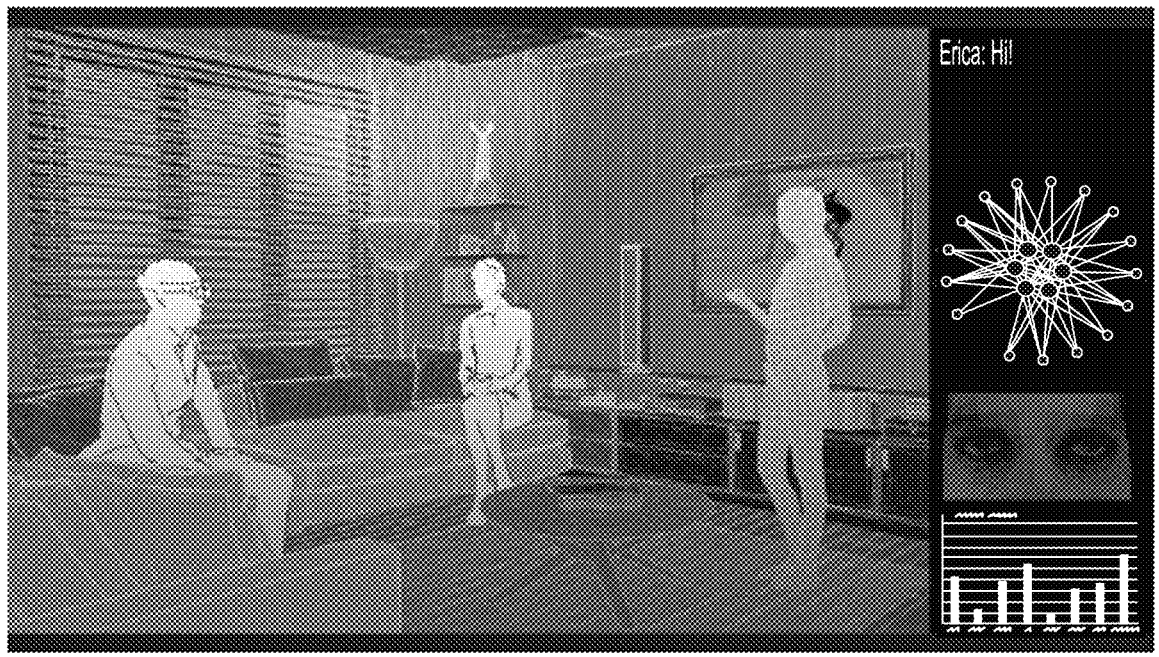

Referring to FIG. 9I, after their dialog, another actual person ("Erica") enters the room and greets Alex. Aya scans Erica's face and recognizes her. Aya perceives Alex's reaction to Erica through the cameras positioned adjacent Alex's eyes on the wearable computer system component (e.g., MR system 212, 300), and "sees" that he's happy to see Erica. Aya creates another memory snapshot, and stores it in the Lifestream.

Figure 9J:

Referring to FIG. 9J, after Alex says hello to Erica, he lets her know that Aya just reminded him of a song he liked at the Pink Floyd concert. Erica replies that she'd like to hear it, so Alex asks Aya to play the song through the physical speakers in the room so that Erica may also hear. Aya turns on the song for all to hear, tells John that she'll talk to him later, and disappears.

Figure 10A:
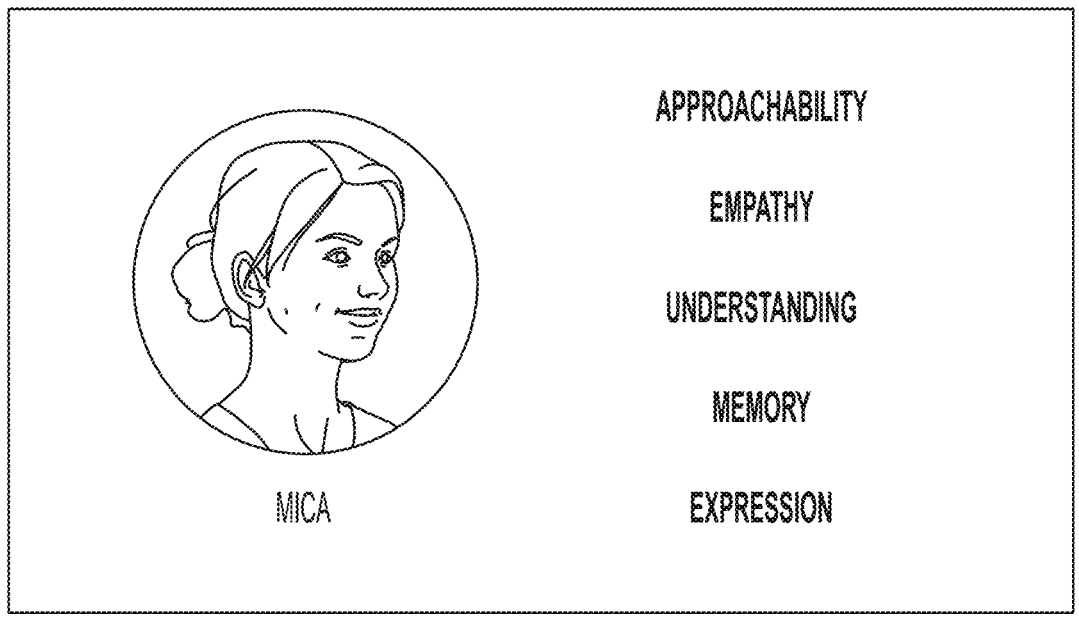
FIGS. 10A-10B illustrate example features of a virtual companion, according to one or more embodiments of the disclosure.
Figure 10B:
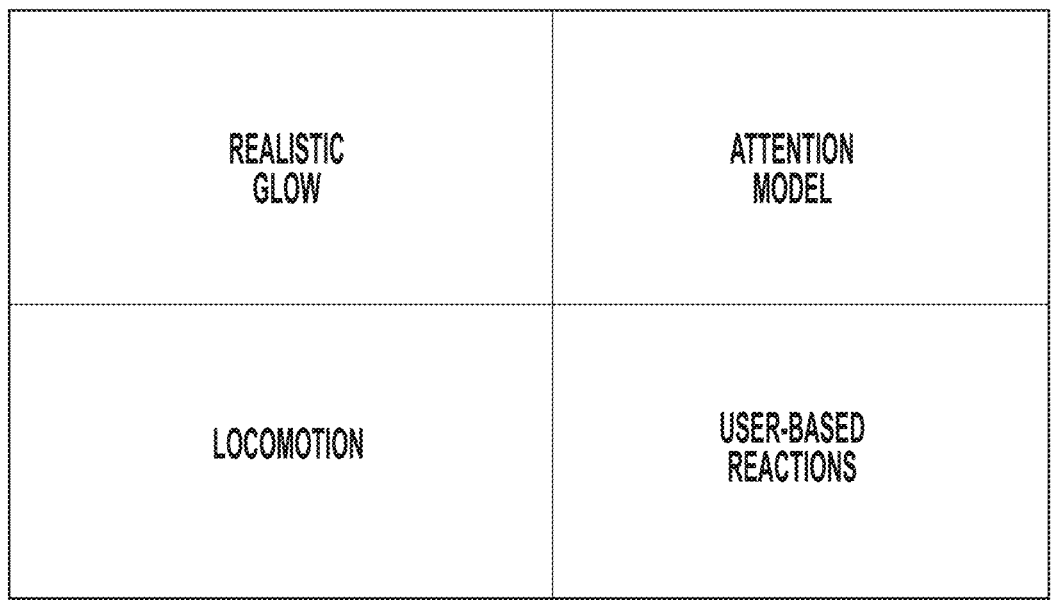

Referring to FIGS. 10A and 10B, a virtual, digital, and/or mixed or augmented reality assistant or companion, such as the embodiment highlighted herein, called "Mica", preferably is configurable to have certain capabilities and traits, such as approachability, empathy, understanding, memory, and expression. Various factors may provide inputs to the presentation of such an AI assistant or companion, such as lighting and realistic glow, realistic locomotion models, user-based reaction models, and attention models. Computer graphics, animation, capture and scanning systems can be critical to creating a lifelike virtual companion, and painstaking detail can be required to achieve a compelling experience. It can take experts from a variety of disciplines to collaborate closely. Get one thing wrong, and the character can be alienating—but when you get things right you can achieve presence and agency. Relative to any other type of character, a digital human arguably is the most difficult, but it is also what users can be most familiar with, and therefore can be a most fulfilling means for developing approachable AI. In mixed reality, as compared with motion pictures, the bar arguably is higher. Interactions with characters are not scripted; by definition, the user should affect how the character responds. For example, after developing an accurate synthetic eye representation system, a character and AI systems can be set up to track gaze with the user. Users can have strong opinions on the character, for example, commenting in ways as they would describe a human. This can be important for developing a human-centered interface to AI. With these developments, important attributes may require special focus AI-related systems are designed and evolve. As noted above, it can be desirable for the system to present a persona to the user which is approachable, empathetic, persistent (i.e., have memory and utilize the concept of Lifestream) and be knowledgeable and helpful. These developments can become the gateways to making AI less alienating and more natural to the user. While the challenges of representing humans or characters are many, character embodiments also tap into subtle nuances of knowledge and understanding that all people have.

Context, details, and nuances can be critical, and intelligence does not exist in vacuum. Just as in human intelligence, AI can emerge not just from one system, but from the interaction of multiple components and agents. It can be desirable to develop the subject systems and configurations thereof as important benchmarks for human-centered AI interfaces to mixed reality, and it can also be desirable to develop software systems to help creators and developers create human-centric experiences. It can be desirable to help developers to create and build experiences driven by humanized AI—experiences that invoke realistic feelings and emotions and facilitate very efficient use of information and computing systems.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

The invention claimed is:

1. A method comprising:
   receiving, at a first time, via a first sensor on a head-wearable device, a first input from an environment of a user;
   receiving user data via a remote resource in communication with the head-wearable device via a network;
   determining, based on the first input and the user data, an occurrence of an event in the environment;
   receiving, via a second sensor on the head-wearable device, a second input from the user;
   identifying, based on the second input, an emotional reaction of the user, wherein the emotional reaction is identified from a group comprising an emotional reaction of a first type and an emotional reaction of a second type;
   determining an association between the emotional reaction and the event;
   receiving, via the second sensor at a second time later than the first time, a third input from the user;
   constructing a query based on the third input, wherein the query is associated with the event; and
   presenting, at the second time, via the see-through display, a response to the query, wherein the response is determined based on the determined association between the emotional reaction and the event.

2. The method of claim 1, wherein the first input comprises at least one of an image of a physical object and an audio signal.

3. The method of claim 1, wherein the second input comprises speech of the user, and wherein identifying the emotional reaction includes determining a content for at least a portion of the speech.

4. The method of claim 1, wherein the second input comprises an eye movement of the user, and wherein identifying the emotional reaction includes determining a gaze direction for the user based on the eye movement.

5. The method of claim 1, wherein the second input comprises a field of view of the user, and wherein identifying the emotional reaction includes identifying at least one object within the field of view.

6. The method of claim 1, the method further comprising determining an intensity of the emotional reaction, wherein the response to the query is determined further based on the intensity.

7. The method of claim 1, wherein the association between the emotional reaction and the event is at least one of a temporal association and a spatial association.

8. The method of claim 1, wherein the event comprises a first event, the method further comprising storing the association between the emotional reaction and the first event in a memory graph, wherein the memory graph comprises an association between the first event and a second event.

9. A system comprising:
a first sensor on a head-wearable device;
a second sensor on the head-wearable device;
a see-through display of the head-wearable device;
one or more processors configured to execute a method comprising:
receiving, at a first time, via a first sensor on a head-wearable device, a first input from an environment of a user;
receiving user data via a remote resource in communication with the head-wearable device via a network;
determining, based on the first input and the user data, an occurrence of an event in the environment;
receiving, via a second sensor on the head-wearable device, a second input from the user;
identifying, based on the second input, an emotional reaction of the user, wherein the emotional reaction is identified from a group comprising an emotional reaction of a first type and an emotional reaction of a second type;
determining an association between the emotional reaction and the event;
receiving, via the second sensor at a second time later than the first time, a third input from the user;
constructing a query based on the third input, wherein the query is associated with the event; and
presenting, at the second time, via the see-through display, a response to the query, wherein the response is determined based on the determined association between the emotional reaction and the event.

10. The system of claim 9, wherein the first input comprises at least one of an image of a physical object and an audio signal.

11. The system of claim 9, wherein the second input comprises speech of the user, and wherein identifying the emotional reaction includes determining a content for at least a portion of the speech.

12. The system of claim 9, wherein the second input comprises an eye movement of the user, and wherein identifying the emotional reaction includes determining a gaze direction for the user based on the eye movement.

13. The system of claim 9, wherein the second input comprises a field of view of the user, and wherein identifying the emotional reaction includes identifying at least one object within the field of view.

14. The system of claim 9, the method further comprising determining an intensity of the emotional reaction, wherein the response to the query is determined further based on the intensity.

15. A non-transitory computer-readable medium storing instructions that, when executed by one or more processors, cause the one or more processors to execute a method comprising:
receiving, at a first time, via a first sensor on a head-wearable device, a first input from an environment of a user;
receiving user data via a remote resource in communication with the head-wearable device via a network;
determining, based on the first input and the user data, an occurrence of an event in the environment;
receiving, via a second sensor on the head-wearable device, a second input from the user;
identifying, based on the second input, an emotional reaction of the user, wherein the emotional reaction is identified from a group comprising an emotional reaction of a first type and an emotional reaction of a second type;
determining an association between the emotional reaction and the event;
receiving, via the second sensor at a second time later than the first time, a third input from the user;
constructing a query based on the third input, wherein the query is associated with the event; and
presenting, at the second time, via the see-through display, a response to the query, wherein the response is determined based on the determined association between the emotional reaction and the event.

16. The non-transitory computer-readable medium of claim 15, wherein the first input comprises at least one of an image of a physical object and an audio signal.

17. The non-transitory computer-readable medium of claim 15, wherein the second input comprises speech of the user, and wherein identifying the emotional reaction includes determining a content for at least a portion of the speech.

18. The non-transitory computer-readable medium of claim 15, wherein the second input comprises an eye movement of the user, and wherein identifying the emotional reaction includes determining a gaze direction for the user based on the eye movement.

19. The non-transitory computer-readable medium of claim 15, wherein the second input comprises a field of view of the user, and wherein identifying the emotional reaction includes identifying at least one object within the field of view.

20. The non-transitory computer-readable medium of claim 15, the method further comprising determining an intensity of the emotional reaction, wherein the response to the query is determined further based on the intensity.

* * * * *